United States Patent
Sudjianto et al.

(10) Patent No.: US 12,106,407 B2
(45) Date of Patent: *Oct. 1, 2024

(54) SYSTEMS AND METHODS FOR GENERATING A SINGLE-INDEX MODEL TREE

(71) Applicant: Wells Fargo Bank, N.A., San Francisco, CA (US)

(72) Inventors: Agus Sudjianto, Charlotte, NC (US); Aijun Zhang, Island E (HK); Zebin Yang, Island E (HK)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,046

(22) Filed: May 2, 2023

(65) Prior Publication Data

US 2023/0267661 A1    Aug. 24, 2023

Related U.S. Application Data

(63) Continuation of application No. 17/305,352, filed on Jul. 6, 2021, now Pat. No. 11,688,113.

(51) Int. Cl.
    *G06T 11/20*    (2006.01)
    *G06F 30/20*    (2020.01)
    (Continued)

(52) U.S. Cl.
    CPC ............ *G06T 11/206* (2013.01); *G06F 30/20* (2020.01); *G06N 20/20* (2019.01); *G06Q 10/067* (2013.01);
    (Continued)

(58) Field of Classification Search
    None
    See application file for complete search history.

(56) References Cited

U.S. PATENT DOCUMENTS

| 6,532,305 B1 | 3/2003 | Hammen |
| 7,660,705 B1 | 2/2010 | Meek et al. |

(Continued)

OTHER PUBLICATIONS

W. Samek, A. Binder, G. Montavon, S. Lapuchkin, and K.-R. Muller, "Evaluating the visualization of what a deep neural network has learned," IEEE Trans. Neural Netw. Learn. Syst., vol. 28, No. 11, 2016.

(Continued)

*Primary Examiner* — Jason A Pringle-Parker
(74) *Attorney, Agent, or Firm* — K&L Gates LLP

(57) ABSTRACT

Systems, apparatuses, methods, and computer program products are disclosed for generating a single-index model (SIM) tree. An example method includes receiving a data set and a maximum tree depth. The example method further includes screening a set of variables from the data set to form split variables. The method may include, while maximum tree depth has not been reached, (i) generating a fast SIM estimation for nodes of a tree level, (ii) for each node, selecting a split point and split variable based on the fast SIM estimation, (iii) based on the selected split points and split variables, generating nodes for a next tree level, each including a subset of data, and (iv) repeating steps (i), (ii), and (iii). The method may include fitting a SIM for each leaf node at maximum tree depth based on a subset of the data set represented by the leaf node.

20 Claims, 11 Drawing Sheets

(51) Int. Cl.
G06N 20/20 (2019.01)
G06Q 10/067 (2023.01)
G06Q 30/0201 (2023.01)
G06Q 30/0204 (2023.01)
G06Q 40/03 (2023.01)

(52) U.S. Cl.
CPC ..... G06Q 30/0205 (2013.01); G06Q 30/0206 (2013.01); G06Q 40/03 (2023.01)

(56) References Cited

U.S. PATENT DOCUMENTS

| | | |
|---|---|---|
| 9,171,259 B1 | 10/2015 | Laxmanan et al. |
| 10,983,492 B1 | 4/2021 | Liu et al. |
| 2002/0099581 A1 | 7/2002 | Chu et al. |
| 2008/0091471 A1 | 4/2008 | Michon et al. |
| 2013/0173513 A1 | 7/2013 | Chu et al. |
| 2017/0220850 A1 | 8/2017 | Caprioli et al. |
| 2018/0114139 A1 | 4/2018 | Kucera |
| 2019/0213685 A1 | 7/2019 | Ironside |
| 2019/0364279 A1 | 11/2019 | Yasugi et al. |
| 2020/0111030 A1 | 4/2020 | Starosta et al. |

OTHER PUBLICATIONS

C. Molnar, Interpretable Machine Learning. Lulu.com, 2020.
W. J. Mudroch, C. Singh, K. Kumbier, R. Abbasi-Asl, and B. Yu, "Definitions, methods, and applications in interpretable machine learning," Proc. Natl. Acad. Sci. U. S. A., vol. 116, No. 44, p. 22 071-22 080, 2019.
M. T. Riberio, S. Singh, and C. Guestrin, "Why should I trust you? explaining the predictions of any classifier," in Proceedings of the 22nd ACM SIGKDD International Conference on Knowledge Discovery and Data Mining. ACM, 2016, pp. 1135-1144.
S. M. Lundberg and S.-I. Lee, "A unified approach to interpreting model predictions," in Advances in Neural Information Processing Systems, 2017, pp. 4765-4774.
S. M. Lundberg, G. Erion, H. Chen, A. Degrave, J. M. Prutkin, B. Nair, R. Katz, J. Himmelfarb, N. Bansal, and S.-I. Lee, "From local explanations to global understanding with explainable AI for trees," Nat. Mach. Intell., vol. 2, No. 1, pp. 56-67, 2020.
C. Rudin, "Stop explaining black box machine learning models for high stakes decisions and use interpretable models instead," Nat. Mach. Intell., vol. 1, No. 5, 2019.
J. H. Friedman and W. Stuetzle, "Projection pursuit regression," J. Am. Stat. Assoc., vol. 76, No. 376, pp. 817-823, 1981.
J. Vaughan, A. Sudijanto, E. Brahimi, J. Chen, and V. N. Nair, "Explainable neural networks based on additive index models," The RMA Journal, pp. 40-49, 2018.
Z. Yang, A. Zhang, and A. Sudijanto, "Enhancing explainability of neural networks through architecture constraints," IEEE Trans. Neural Netw. Learn. Syst., 2020.
H. Seibold, A. Zeileis, and T. Hothorn, "Model-based recursive partitioning for subgroup analyses," Int. J. Biostat., vol. 12, No. 1, pp. 45-63, 2016.
R. B. Gramacy and H. Lian, "Gaussian process single-index models as emulators for computer experiments," Technometrics, vol. 54, No. 1, pp. 30-41, 2012.
T. Wang and Y. Xia, "A piecewise single-index model for dimension reduction," Technometrics, vol. 56, No. 3, pp. 312-324, 2014.
H. Lian, X. Qiao, and W. Zhang, "Homogeneity pursuit in single index models based panel data analysis," J. Bus. Econ. Stat., pp. 1-44, 2019.
H. Zhang and B. H. Singer, Recursive partitioning and applications. Springer Science & Business Media, 2010.
J. H. Friedman, "Multivariate adaptive regression splines," Ann. Stat., pp. 1-67, 1991.
J. N. Morgan and J. A. Sonquist, "Problems in the analysis of survey data, and a proposal," J. Am. Stat. Assoc., vol. 58, No. 302, pp. 415-434, 1963.
R. K. Pace and R. Barry, "Sparse spatial autoregressions," Stat. Probab. Lett., vol. 33, No. 3, pp. 291-297, 1997.
L. Breiman and W. Meisel, "General estimates of the intrinsic variability of data in nonlinear regression models," J. Am. Stat. Assoc., vol. 71, No. 354, pp. 301-307, 1976.
J. H. Freidman, "A tree-structured approach to nonparametric multiple regression," in Smoothing Techniques for Curve Estimation. Springer, 1979, pp. 5-22.
J. R. Quinlan, "Learning with continuous classes," in Australian Joint Conference on Artificial Intelligence, 1992, pp. 343-348.
W.-Y. Loh, "Regression tress with unbiased variable selection and interaction detection," Stat. Sin., pp. 361-386, 2002.
K.-Y. Chan and W.-Y. Loh, "Lotus: An algorithm for building accurate and comprehensible logistic regression trees," J. Comput. Graph. Stat., vol. 13, No. 4, pp. 826-852, 2004.
N. Landwehr, M. Hall, and E. Frank, "Logistic model trees," Mach. Learn., vol. 59, No. 1-2, pp. 161-205, 2005.
J. Friedman, T. Hastie, and R. Tibshirani, "Additive logistic regression: a statistical view of boosting (with discussion and a rejoinder by the authors)," Ann. Stat., vol. 28, No. 2, pp. 337-407, 2000.
A. Zeileis, T. Hothorn, and K. Hornik, "Model-based recursive partitioning," J. Comput. Graph. Stat., vol. 17, No. 2, pp. 492-514, 2008.
L. Hu, J. Chen, V. N. Nair, and A. Sudijanto, "Locally interpretable models and effects based on supervised partitioning (lime-sup)," arXiv preprint arXiv:1806.00663, 2018.
L. Hu, et al., "Surrogate locally-interpretable models with supervised machine learning algorithms," arXiv preprint arXiv:2007.14528, 2020.
R. Kohavi, "Scaling up the accuracy of naive-bayes classifiers: a decision-tree hybrid," in Proceedings of the International Conference on Knowledge Discovery and Data Mining, 1996, pp. 202-207.
W. Hardle and T. M. Stoker, "Investigating smooth multiple regression by the method of average derivatives," J. Am. Stat. Assoc., vol. 84, No. 408, pp. 986-995, 1989.
H. Ichimura, "Semiparametric least squares (SLS) and weighted SLS estimation of single-index models," J. Econom., vol. 58, No. 1-2, pp. 71-120, 1993.
K.-C. Li, "Sliced inverse regression for dimension reduction," J. Am. Stat. Assoc., vol. 86, No. 414, pp. 316-327, 1991.
Y. Xia, H. Tong, W. Li, and L.-X. Zhu, "An adaptive estimation of dimension reduction space," J. R. Stat. Soc. Series B Stat. Methodol., vol. 64, No. 3, pp. 363-410, 2002.
Z. Yang, K. Balasubramanian, and H. Liu, "High-dimensional non-Gaussian single index models via thresholded score function estimation," in International Conference on Machine Learning, 2017, pp. 3851-3860.
Z. Yang, K. Balasubramanian, Z. Wang, and H. Liu, "Learning non-Gaussian multi-index model via second-order Stein's method," in Advancesin Neural Information Processing Systems, 2017, pp. 6097-6106.
K. Balasubramanian, J. Fan, and Z. Yang, "Tensor Methods for Additive Index Models under Discordance and Heterogeneity," arXiv preprint arXiv:1807.06693, 2018.
S. Na and M. Kolar, "High-dimensional Index Volatility Models via Stein's Identity," arXiv preprint arXiv:1811.10790, 2018.
S. Na, Z. Yang, Z. Wang, and M. Kolar, "High-dimensional varying index coefficient models via Stein's identity," J. Mach. Learn. Res., vol. 20, No. 152, pp. 1-44, 2019.
C. Stein, P. Diaconis, S. Holmes, and G. Reinert, "Use of exchangeable pairs in the analysis of simulations," in Stein's Method. Institute of Mathematical Statistics, 2004, pp. 1-25.
Y. Plan and R. Vershynin, "The generalized lasso with non-linear observations," IEEE Trans. Inf. Theory, vol. 62, No. 3, pp. 1528-1537, 2016.
C. Gu, Smoothing spline ANOVA models. Springer Science & Business Media, 2013, vol. 297.

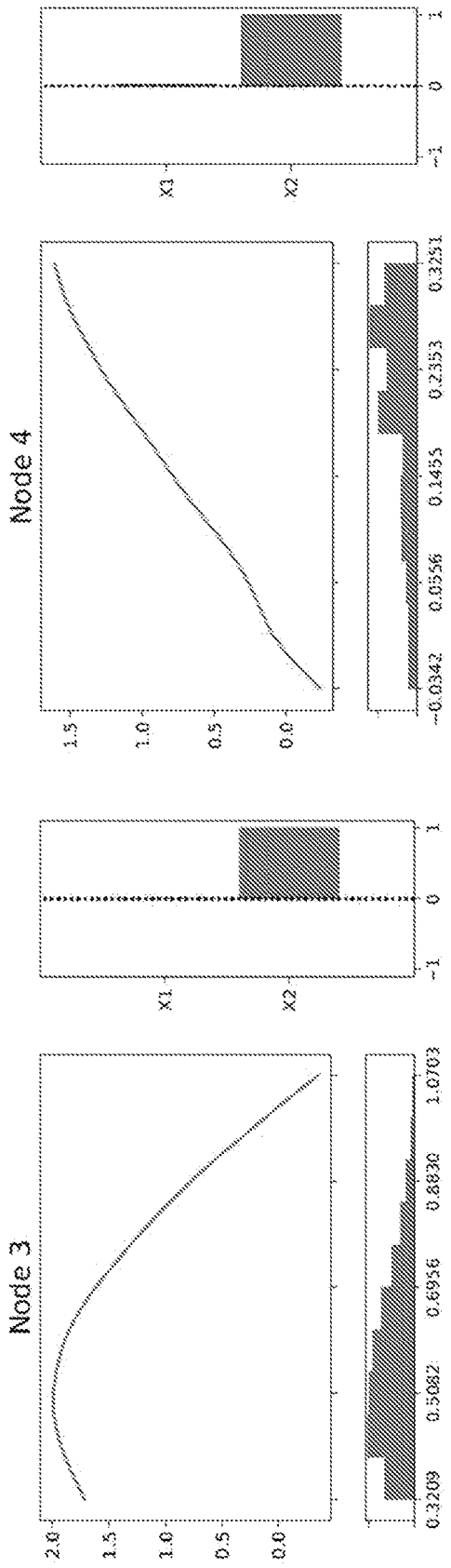
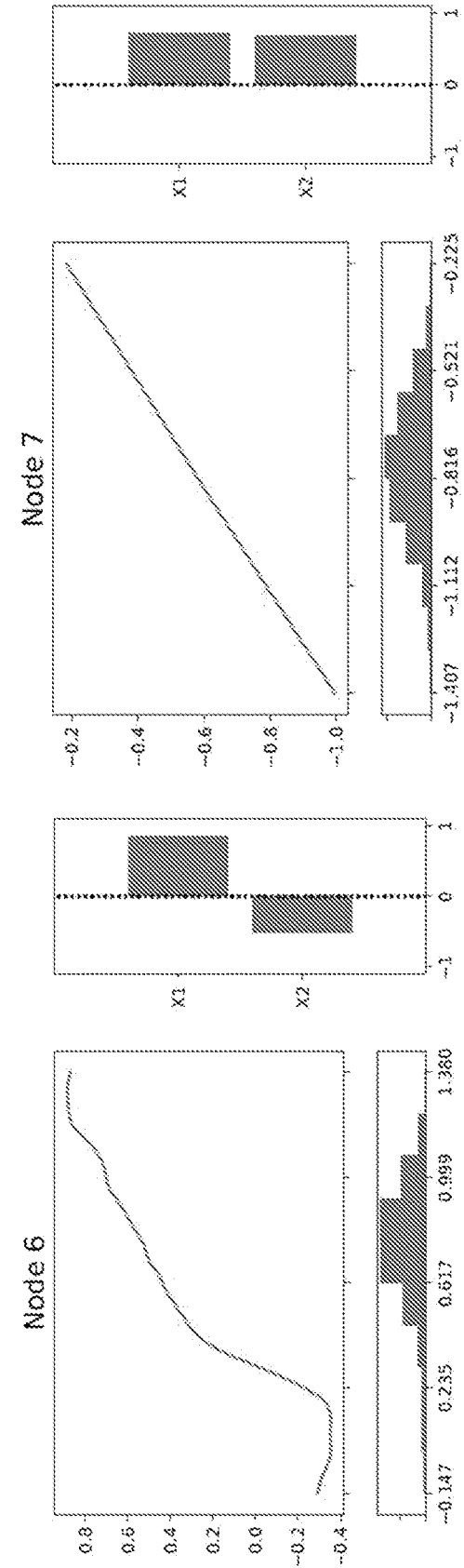
FIG. 4B  FIG. 4C
FIG. 4D  FIG. 4E

SYSTEMS AND METHODS FOR GENERATING A SINGLE-INDEX MODEL TREE

CROSS-REFERENCE TO RELATED APPLICATIONS

This application is a continuation of U.S. application Ser. No. 17/305,352 filed Jul. 6, 2021, the entirety of which is incorporated herein by reference.

TECHNOLOGICAL FIELD

Example embodiments of the present disclosure relate generally to computer-aided model generation and, more particularly, to systems and methods for generating a single-index model (SIM) tree.

BACKGROUND

Machine learning algorithms may be chosen for use based on several factors, including interpretability and prediction accuracy. As machine learning or artificial intelligence becomes more prevalent, interpretability may play a larger factor in why a user may choose one model over another. Once a complex model has been fitted, post-hoc analysis may explain the complex model. However, such post-hoc analysis is often based on assumptions and not fully reliable. Alternatively, as interpretability increases in a model, accuracy may decrease, e.g., less accurate predictions may be made. For example, rather than attempting to explain or interpret black-box models, an intrinsically interpretable model may be utilized, albeit at the sacrifice of accuracy, at least in comparison to state-of-the-art complex models.

BRIEF SUMMARY

As noted, highly accurate machine learning models may not be easily or intrinsically interpretable or explainable. Such scenarios prohibit or prevent a user from explaining how a result or output for a particular input is achieved. For example, in a credit application, an applicant may be denied credit or limited to a lower amount of credit than requested, based on numerous factors. In a typical black box model, the input would go into the black box, and an output would be given. Little or no indication would be given as to what factors affected the application. In such examples, certain factors may have a higher impact on the application, e.g., credit score or salary, than other factors, e.g., age of existing credit. Since the model is a black box, there is no simple way to look at the output and give a customer or applicant a determinative answer as to why, for example, they were denied or offered a lower amount. As machine learning is utilized more often, users of such models may continue to experience issues with interpretability of such models. Interpretability, in addition to high levels of accuracy, is steadily increasing in regards to traits that a user looks for in a model.

As noted above, interpretability is an increasingly relevant factor for models. Described herein is a new solution, called a single index model (SIM) tree, which takes training data, in addition to other inputs, to generate a highly accurate and highly interpretable model. While other models, such as a classification and regression tree (CART), are interpretable, such models are not as accurate. Other models, such as a random forest (RF) or extreme gradient boosting (XGBoost) models, may be highly accurate and, potentially, take more or less time to generate, but are too complex to interpret. As described below, the SIM tree may be generated via fast SIM estimation, and may include data in each node, e.g., split variable, sample size, mean squared error (MSE), and/or mean. This approach applies fast SIM estimations, e.g., via a Stein's lemma equation or calculation, to determine the best split point and split variable per node and fits a SIM to each final or leaf node. Further and as illustrated below, the SIM tree demonstrates improved interpretability, and/or high accuracy by utilizing the fast SIM estimations to generate split points and split variables per node.

Systems, apparatuses, methods, and computer program products are disclosed herein for generating a single-index model (SIM) tree. In one example embodiment, a system is provided for generating the SIM tree. The system may include processing circuitry or input-output circuitry for receiving a data set, a maximum tree depth, and/or other hyperparameters. The system further may include a modeling engine configured to screen a set of variables from the data set to thereby form split variables. While the maximum tree depth of the SIM tree has not been reached, the modeling engine may be configured to generate a fast SIM estimation for one or more nodes of a tree level or current tree level; for each particular node of the one or more nodes, select a split point and split variable based on the fast SIM estimation for the particular node; based on the selected split points and split variables for the nodes at the tree level or current tree level generate a set of nodes for a next tree level, each node for the next tree level including a subset of data from the parent node; and determine whether the next tree level is equal to the maximum tree level. The modeling engine may further be configured to, after the maximum tree level has been reached, fit a SIM for each leaf node of the SIM tree based on the subset of data set represented by the leaf node. Generating the SIM tree produces a tree shaped structure that portions of the data that increases interpretability or explainability. Following generation of the SIM tree, the system may generate a graphical representation of the SIM tree. The graphical representation may include each node and split connecting the nodes of the SIM tree. The graphical representation may be interactive and/or may be transmitted or displayed on or to a user interface.

In another example embodiment, a method is provided for generating a single-index model (SIM) tree. The method may include receiving a data set and a maximum tree depth. The method may include screening a set of variables from the data set to thereby form split variables. The method may include, while the maximum tree depth has not been reached, iteratively, generating a fast SIM estimation for one or more nodes of a tree level; for each particular node of the one or more nodes, selecting a split point and split variable based on the fast SIM estimation for the particular node; based on the selected split points and split variables for the nodes at the tree level, generating a set of nodes for a next tree level, each node for the next tree level including a subset of data included in a node at the tree level; and repeating the previous steps for the nodes at the next tree level. The method may include, in response to generation of nodes for the maximum tree depth, fitting a SIM for each leaf node of the SIM tree based on a subset of the data set represented by the leaf node.

In another embodiment, the method may further include, after generation of the SIM tree, generating a graphical representation of the SIM tree. The graphical representation may depict a box for each of the one or more nodes. In another embodiment, each box for a layer prior to the maximum tree depth may include a split variable, a split point for the split variable, a mean squared error loss, a sample number representing a number of data points for a node, and an average response level. In another embodiment, each box for a layer at the maximum tree depth may include a mean squared error loss, a sample number representing a number of data points for a node, an average response level, and a corresponding fitted SIM.

In another embodiment, the method may further include, prior to screening the set of variables, receiving a smoothness strength and a sparsity strength for the fast SIM estimation. The fast SIM estimation may utilize a value of 0 for the sparsity strength in a calculation of projection coefficients and a fixed value for the smoothness strength in a cubic smoothing spline calculation. The projection coefficients in a fast SIM estimation may be a Stein's lemma calculation. The data set, the maximum tree depth, the smoothness strength, and the sparsity strength may be received from a user interface.

In another embodiment, the method may include, prior to screening the set of variables, receiving a minimum sample number per node and a minimum loss decrease. The selection of a split point and split variable may further be based on a number of samples per each potential split in relation to the minimum sample number per node and the mean squared error loss per each potential split in relation to the minimum loss decrease.

In another embodiment the method may include, after screening the set of variables, scoring each of the split variables. The split variable for the particular node may further be selected based on a split variable's score.

In another example, a computer program product is provided for generating a single-index model (SIM) tree. The computer program product may include at least one non-transitory computer-readable storage medium storing software instructions that, when executed, may cause an apparatus to receive a data set, a maximum tree depth, a smoothness strength, a sparsity strength, and a sample threshold. The computer program product may determine a set of variables from the data set to form a set of split variables. The computer program product may be configured to, while the tree level is not equal to maximum tree depth, generate a fast SIM estimation for each node of a current tree level based on a set of data corresponding to each one or more nodes, the smoothness strength, and the sparsity strength; determine, based on the fast SIM estimation, a split point and split variable for each node of the current tree level based on the sample threshold and a minimum loss; generate, based on the split point and split variable, a set of nodes for a next tree level, each node of the set of nodes including a subset of data included in a parent node; and determine whether the next tree level is at the maximum tree depth. The computer program product may be configured to in response to a determination that the next tree level is at the maximum tree depth, fit a SIM for each node at the maximum tree depth based on a subset of data of each node at the maximum tree depth.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures. The patent or application file contains at least one drawing executed in color. Copies of this patent or patent application publication with color drawing(s) will be provided by the Office upon request and payment of the necessary fee.

FIG. 4B illustrates an example fitted SIM for node 3 of a SIM tree, in accordance with example embodiments described herein.

FIG. 4C illustrates an example fitted SIM for node 4 of a SIM tree, in accordance with example embodiments described herein.

FIG. 4D illustrates an example fitted SIM for node 6 of a SIM tree, in accordance with example embodiments described herein.

FIG. 4E illustrates an example fitted SIM for node 7 of a SIM tree, in accordance with example embodiments described herein.

DETAILED DESCRIPTION

Figure 1:
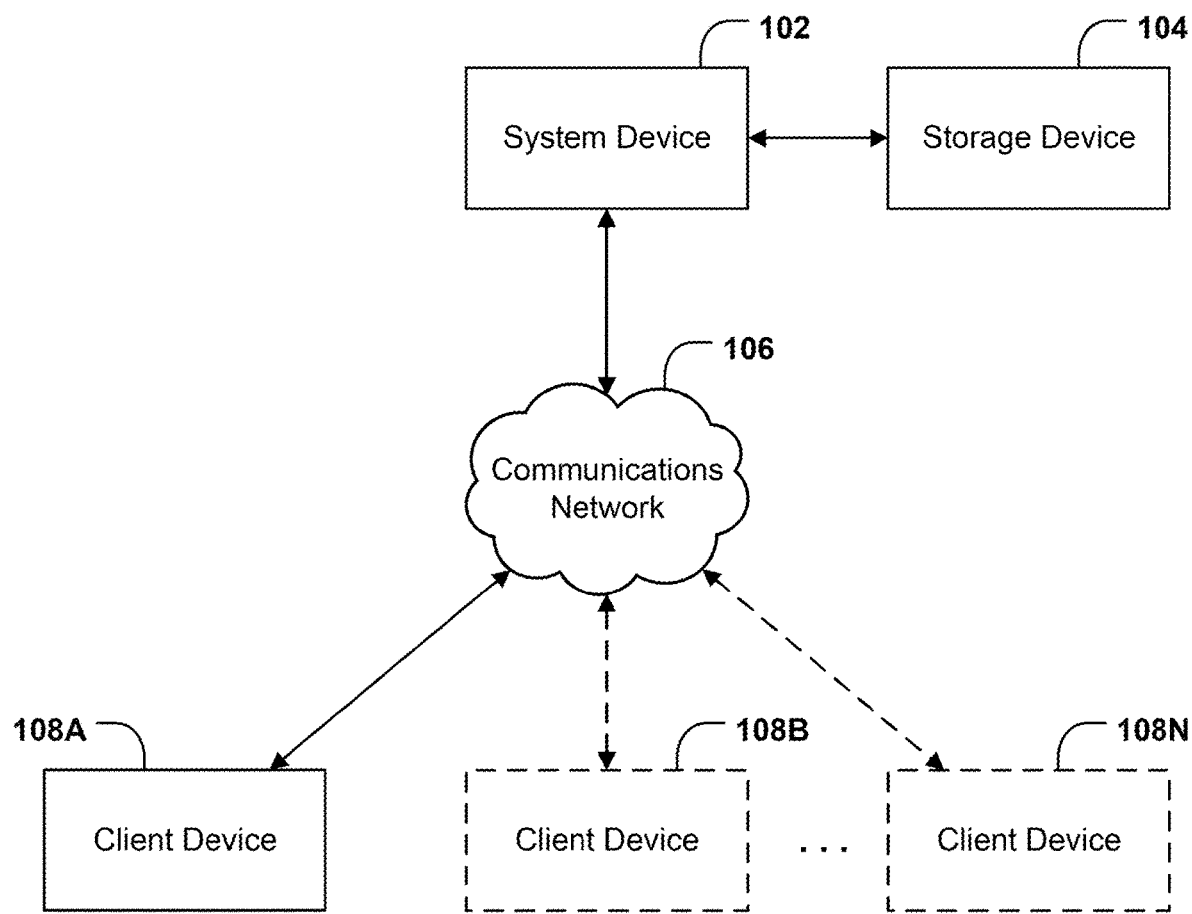
FIG. 1 illustrates an environment in which some example embodiments may be used for generating and/or utilizing a SIM tree.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for generating a SIM tree with high interpretability, as well as high accuracy. The SIM tree may be output to a user to illustrate how the SIM tree determines an output. At a high level, the procedure involves two steps.

First, the procedure involves training or generating, via a fast training algorithm and/or fast SIM estimation, split points and split variables for each node of a layer of the SIM tree. In such procedures, one or more of the fast training algorithm or fast SIM estimation is run for a subset of the overall variables. To prevent overfitting, a smoothness constraint may be utilized, while removal of negligible coefficients may be accomplished via the use of a sparsity constraint. Based on the variable with the highest performance gain, a split variable and split point may be chosen or selected. Once the split variable and split point are chosen or selected, two nodes may be generated from each node of the layer of the SIM tree. Such a procedure may be iterative until the maximum tree depth is reached or, in other words, the procedure may be repeated until the maximum tree depth is reached. Once the maximum tree depth is reached, a SIM may be fitted to each leaf node or the last layer of nodes in the SIM tree.

Second, the procedure may involve generating a graphical representation of the SIM tree. Each node may be represented by a box. The box may include various data points, that aid in interpretability of the model. For example, a box may include the split variable, the number of samples in a node (e.g., size), the mean squared error (MSE), the mean, and/or other relevant data to aid in interpretability. Further, each leaf node or each node of the final layer at maximum tree depth may include the SIM corresponding to that node, as well as other charts illustrating or showing the most important variables.

Typically, the MSE or root mean squared error (RMSE) is utilized to determine or evaluate the accuracy of a prediction or estimator. To further aid in interpretability and as noted, the MSE or RMSE may be included as a visual data point for each node of the SIM tree. Further, a SIM may be utilized to determine best split points and split variables. However, using a SIM or other types of models may increase the time taken and the difficulty to determine best split points and split variables. As such, the fast training algorithm or fast SIM estimation may be utilized. Such algorithms or estimations may include a Stein's lemma theorem or calculation.

As demonstrated below through the provided experimental results or examples, it is evident that the use of the fast training algorithm or fast SIM estimation enables the selection of the best split points and split variables in a reasonable amount of time. Further, tree structure of the SIM tree and clear choices of splits for each node allow for high interpretability. Further, while in some cases, the SIM tree may not be the most accurate, in relation to MSE or RMSE, the SIM tree still exhibits high levels of accuracy, while maintaining the high level of interpretability.

Although described above at a high level, specific details regarding the configuration of example embodiments for generating the SIM tree are provided below.

System Architecture

Example embodiments described herein may be implemented using any of a variety of computing devices or servers. To this end, FIG. 1 illustrates an example environment within which embodiments of the present disclosure may operate. As illustrated, a system device 102 is shown that may perform various operations for generating a SIM tree, in accordance with the embodiments set forth herein. The system device 102 is connected to a storage device 104. Although system device 102 and storage device 104 are described in singular form, some embodiments may utilize more than one system device 102 or one or more storage device 104. Whatever the implementation, the system device 102 and any constituent components (as described below in connection with FIG. 2) may receive and/or transmit information via communications network 106 (e.g., the Internet) with any number of other devices. In this regard, system device 102 may be implemented as one or more servers that may interact via communications network 106 with one or more client devices, shown in FIG. 1 as client device 108A, client device 108B, through client device 108N. In this way, the system device 102 may interact with a number of users by offering the ability to generate and use the SIM tree in a software-as-a-service (SaaS) implementation. System device 102 may alternatively be implemented as a device with which users may interact directly. In such embodiments, a user may utilize the system device 102 directly to generate and/or use the SIM tree.

System device 102 may be entirely located at a single facility such that all components of system device 102 are physically proximate to each other. However, in some embodiments, some components of system device 102 may not be physically proximate to the other components of system device 102, and instead may be connected via communications network 106. Particular components of system device 102 are described in greater detail below with reference to apparatus 200 in connection with FIG. 2.

Storage device 104 may comprise a distinct component from system device 102, or it may comprise an element of system device 102 (e.g., memory 204, as described below in connection with FIG. 2). Storage device 104 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 106). Storage device 104 may host the software executed to operate the system device 102 to generate a SIM tree. In addition, or in the alternative, storage device 104 may store information relied upon during operation of the system device 102, such as training data or a data set used for generation of a given SIM tree. In addition, storage device 104 may store control signals, device characteristics, and access credentials enabling interaction between the system device 102 and one or more of client device 108A through client device 108N.

Client device 108A through client device 108N may be embodied by any computing devices known in the art, such as desktop or laptop computers, tablet devices, smartphones, or the like. These devices may be independent devices, or may in some embodiments be peripheral devices communicatively coupled to other computing devices. Although FIG. 1 illustrates an environment and implementation of the present disclosure in which the system device 102 interacts with one or more of client device 108A through client device 108N, in some embodiments clients may directly interact with the system device 102 (e.g., via input/output circuitry of system device 102), in which case a separate client device need not be utilized. Whether by way of direct interaction or via a separate client device, a client may communicate or otherwise interact with the system device 102 to perform functions described herein and/or achieve benefits as set forth in this disclosure.

Example Implementing Apparatuses

Figure 2:
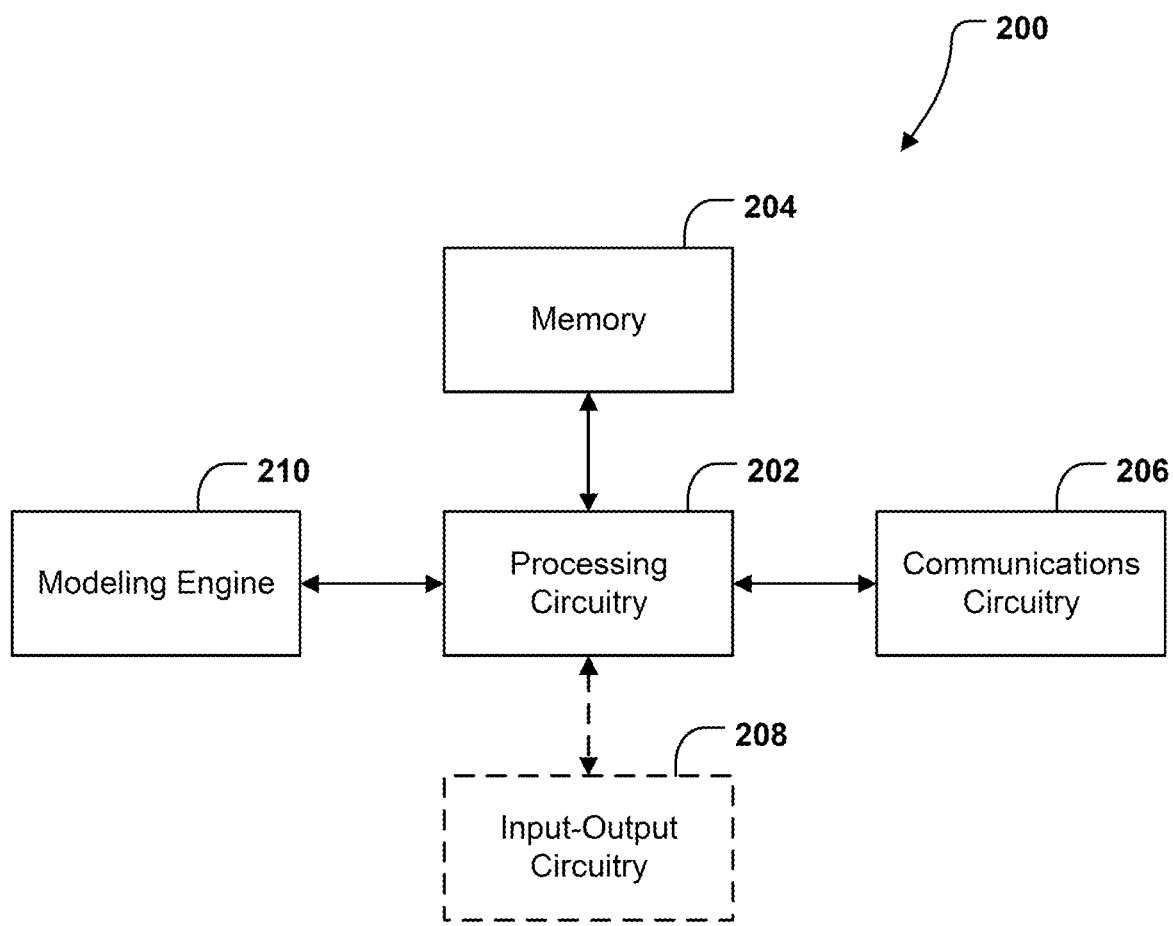
FIG. 2 illustrates a schematic block diagram of example circuitry embodying a device that may perform various operations in accordance with example embodiments described herein.

System device 102 (described previously with reference to FIG. 1) may be embodied by one or more computing devices or servers, such as the apparatus 200 shown in FIG. 2. As illustrated in FIG. 2, apparatus 200 may include processor 202, memory 204, communications circuitry 206, input-output circuitry 208, and modeling engine 210, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIG. 6.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 104, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

Input-output circuitry 208 may be any means configured to provide output to a user and, in some embodiments, to receive an indication of user input. It will be noted that some embodiments will not include input-output circuitry 208, in which case user input may be received via a separate device such as a client device 112 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a modeling engine 210 designed to generate a SIM tree using received training data or a data set. The modeling engine 210 may utilize processor 202, memory 204, or any other hardware component included in the apparatus 200 to perform these operations, as described in connection with FIGS. 3-5F below. The modeling engine 210 may further utilize communications circuitry 206 to gather data from a variety of sources (e.g., any of client device 108A through client device 108N or storage device 104, as shown in FIG. 1), and may utilize input-output circuitry 208 to transmit and/or receive data directly from a user.

In addition, the apparatus 200 further comprises digitization circuitry configured to generate, revise, analyze, retrieve, or otherwise utilize a digital affiliated business arrangement disclosure statement (ABAD). The digitization circuitry may utilize processor 202, memory 204, or any other hardware component included in the apparatus 200 to perform these operations. The digitization circuitry may further utilize communications circuitry 206 to gather data from a variety of sources (e.g., client device 108A through client device 108N or storage device 104, as shown in FIG. 1), and may utilize input-output circuitry 208 to exchange information directly with a user.

Although components 202-210 are described in part using functional language, it will be understood that the particular implementations necessarily include the use of particular hardware. It should also be understood that certain of these components 202-210 may include similar or common hardware. For example, the modeling engine 210, may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the modeling engine 210 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the modeling engine 210 is implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components described above as comprising the apparatus 200.

As will be appreciated based on this disclosure, example embodiments contemplated herein may be implemented by the apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200 for generating a SIM tree, a more detailed description of example embodiments by which the apparatus 200 may operate are described below. Immediately below is a description of the SIM tree methodology as set forth herein. Subsequently, results of simulation studies and real data analysis are provided that demonstrate that the SIM tree solution set forth herein generates highly interpretable models, while maintaining high levels of accuracy. Finally, a series of operations will be described in connection with a series of flowcharts in order to illustrate the generation and/or use of a SIM tree using an example apparatus 200.

Single Index Model (SIM) and Model-Based Trees

The following section will generally describe SIMs followed by model-based trees. A SIM is a widely used interpretable model. Given predictors, $x \in R^d$, the response y is expressed as follow:

$$y = h(w^T x) + \epsilon$$

For such an expression, $\epsilon$ is the zero-mean noise term, $x \in R^d$ is the projection index, and h is the univariate ridge function. Further, it is typically assumed the $\|w\|_2 = 1$, for identifiability or interpretability. The SIM may be easily interpretable in terms of w and h. For example, when h is a linear function, the SIM may be reduced to a linear regression model. The flexibility in h makes the SIM more expressive, so as to capture non-linear functions.

An additive index model (AIM) may be a natural extension of SIM. AIM may be formulated as follows:

$$y = \sum_{k=1}^{K} h(w^T x) + \epsilon$$

K may be the number of additive components. AIM may be employed in developing explainable neural networks (xNN). AIM's interpretability may be further enhanced with suitable constraints.

However, the above SIM-based models all assume homogenous patterns across all data samples. For real-world datasets, heterogeneous patterns are generally hard to detect, and building a global model for such data can be misleading. For large scale heterogeneous data, partitioning the data into disjoint segments and individually modeling each local segment is suggested. For example, Gaussian process SIMs may be proposed as the emulator of computer experiments and that a tree-structured SIM may help to model heterogeneous patterns.

Moving to model-based trees, such models are widely used as trees with easily interpretability and relatively good predictive performance. Such models include recursively partitioning the data with heterogeneous local models. Further, such models have been widely used in both statistic and machine learning communities. A model based tree may be formulated by:

$$f(x) = \sum_{k=1}^{K} B_k(x) h_k(x)$$

where $h_k(x)$ is the base learner on the local domain $R_k$, which defines the basis function Bk:

$$B_k(x)=I[x \in R_k]$$

Here I may be an indicator function and data segments $\{R_k\}_{k=1}^{K}$ may make up the entire domain. For simplicity, we assume that all the data segments are mutually disjoint. Piecewise constant recursive partitioning is the simplest form that uses constant functions as base learners. The resulting model can be visualized using a tree structure, e.g., the root node splitting all the data into two subsamples, the child (left and right) nodes then recursively partitioning the data and each leaf representing a data segment or subset/subsample of overall data. The decision tree model was originally introduced for analyzing survey data and the classification and regression tree (CART) further makes the decision tree model a more powerful tool.

CART is capable of capturing non-linear patterns, while the tree structure is easy to visualize and interpret. However, with the fast development of machine learning techniques, ensemble models like random forest (RF) and extreme gradient boosting (XGBoost) tend to have a better predictive performance. Such ensemble models are shown to have powerful predictive performance, while fitted models become too complex to interpret.

In an example, to improve the predictive performance of CART, the constant function may be replaced with parametric models, i.e., model-based trees. The generalized linear model (GLM) is the most commonly used parametric model for recursive partitioning. In an example, data may be partitioned according to randomly generated hyperplanes and each child data segment is fitted using linear least squares regression. In another example, child nodes are jointly fitted to a piece-wise linear model to the residual of their parent node, which ensures continuity of different data segments. In yet other examples, an algorithm first builds a standard classification tree and then replaces the constant leaves with linear models.

A more direct approach for building GLM-based trees is to greedily search the optimal univariate splits for GLM fits, such as with GUIDE. GUIDE is a model-based regression tree built upon linear regression. To reduce the selection bias of split variables, GUIDE separates the variable selection from the search of split points. Like GUIDE, LOTUS is a classification tree build upon logistic regression. The logistic model tree (LMT) also uses logistic regression for each leaf, while the child nodes are recursively fitted by refining the model of their parent node, i.e., by LogitBoost algorithm. However, the issue of using such a parametric function lies in the large time-complexity. To address this issue, one proposal included a general framework to detect the most promising split variables by a parameter instability fluctuation test.

SIM Tree

The SIM tree extends existing model-based recursive partitioning methods with a SIM as the base learner. The traditional decision tree method is extended to use SIM for splitting variables and leaf node predictions. Stein's lemma may be utilized for efficient SIM estimation or fast training. A fast training algorithm and/or fast SIM estimation is proposed for the SIM tree. Such an algorithm or estimation significantly reduces the time complexity for practical implementation. Numerical experiments show that the SIM tree provides a good trade-off between accuracy and interpretability. The SIM tree achieves competitive predictive performance as compared to other tree-based black-box machine learning models, while the fitted model is easily interpretable.

Model-based Trees follow the idea of "divide and conquer", and the main principle is to divide the entire domain into different data segments, such that each data segment can be well modeled by a local model. Under this framework, the SIM tree uses semi-parametric SIM as the base learner, i.e., $h_k = h_k(w_k^T x)$. Thus SIM tree may be formulated by:

$$f(x) = \sum_{k=1}^{K} B_k(x) h_k(w_k^T x)$$

where $w_k$ and $h_k$ are the projection index and univariate ridge function, respectively, for the k-th data segment.

In a SIM tree, SIM estimation enables or allows for both the search of optimal splits and building leaf models. To estimate $h(w^T x)$ defined above, the projection index w and the non-parametric function h should be estimated. Such estimations may include average derivative estimation, semiparametric least squares estimation, sliced inverse regression, and minimum average conditional variance estimation. Although the computational burden of SIM estimation is relatively affordable, directly employing these classic estimators in SIM tree may significantly increase execution time. In contrast, a fast training algorithm or fast SIM estimation may be utilized to increase the speed of this procedure. In an example, the first-order Stein's identity may be employed for estimating the projection index. In other examples, the non-parametric function h may be fitted through any curve fitting techniques.

To build an arbitrary tree of SIMs may not guarantee its interpretability, and it should be constrained to be interpretable, as follows. First, each projection index $w_k$ is assumed to be sparse. The sparsity constraint may help remove negligible coefficients and the resulting model may be significantly more interpretable. Second, each ridge function $h_k$ is assumed to be smooth. The smoothness constraint is also used in non-parametric regression, in which a roughness penalty is imposed to achieve smooth representations. Such a constraint may prevent overfitting, but may also eliminate possible wiggles that are hard to interpret.

As noted, the projection index may be estimated via Stein's lemma. Assuming that the input variable $x \in R^d$ has a joint probability density $p(x): R^d \rightarrow R$, then the first-order Stein's lemma is defined as follows.

Assuming the density of x is differentiable and the first-order score function $S_1(x) = -\nabla_x p(x)/p(x)$ exists, for any differentiable function h such that $E[\nabla_x(x)]$ exists and all the entries of $p(x)h(x)$ go to zero on the boundaries of support of $p(x)$, then the following calculation may be utilized:

$$E[h(x)S_1(x)] = E[\nabla_x h(x)]$$

The first-order Stein's identity can be used to extract the projection index of SIM:

$$E[h(x)S_1(x)] = E[h'(\langle x, w \rangle)]w$$

where the expectation of the first-order derivative is a constant term. As $E[h'(\langle x, w \rangle)] \neq 0$, the coefficients are proportional to $S_1(x)y$. Assume the predictors $x \sim N(\mu, \Sigma)$, the estimator may be $$\hat{w}^T = \frac{1}{n}\sum_{i=1}^{n} S_1(x_i) y_i = \frac{1}{n}\sum_{i=1}^{n} \Sigma^{-1}(x_i - \mu) y_i$$

Such an estimator may be the ordinary least squares (OLS) solution for linear regression tasks. However, such an estimator may be easily affected by noises and the coefficients are not sparse. To induce $l_1$-sparsity, the least absolute shrinkage and selection operator (Lasso) may be directly employed for estimating the coefficients subject to sparsity constraint, which is generally favorable regarding model interpretability.

Given $z=\hat{w}^T x$ fixed, the next step is to estimate the univariate function $h(w^T x)$ by data $\{z_i, y_i\}_{i\in[n]}$. To begin, a classical cubic smoothing spline technique is chosen. A smoothing spline minimizes the following objective:

$$\sum_{i=1}^{n} \{y_i - \hat{h}(z_i)\}^2 + \gamma \int \hat{h}''(z)^2 dz$$

where $\gamma \geq 0$ is the smoothing parameter, which penalizes the second-order derivatives (roughness) of the fitted function $\hat{h}$. The function $\hat{h}$ is expressed as a set of polynomial basis functions:

$$\hat{h}(x) = \sum_{j=1}^{n} \hat{\beta}_j g_j(z)$$

where each $g_j$ is generated according to the knots spanned over all the unique values of the input variable. All the basis functions form a matrix $G \in R^{n \times n}$, in which $G_{ij}=g_j(z_i)$. Accordingly, the above objective function can be reformulated:

$$\|y - G\beta\|2/2 + \gamma \beta^T \Omega \beta,$$

where $\Omega_{ij}=\int g''_i(t) g''_j(t) dt$. This optimization problem can be solved by $$\hat{\beta}=(G^T G + \gamma \Omega)^{-1} G^T y.$$

When dealing with big data, the smoothing spline calculation or determination may be time consuming as the basis matrix is n×n. In practice, the number of knots may be reduced to a subset of all the unique values of the input variable. The above procedures of SIM fitting are summarized in Algorithm 1 illustrated below.

---
Algorithm 1 Fast Training Algorithm for SIMs
---

Require: $\{x_i, y_i\}_{i\in[n]}$ (Training data), $\lambda$ (Sparsity strength), $\gamma$ (Smoothness strength).
1: if $\lambda = 0$ then
2:    Estimate the projection index $\hat{w}$ by OLS estimator (7).
3: else
4:    Estimate $\hat{w}$ via Lasso estimator with sparsity $\lambda$.
5: end if
6: Calculate the projected data $z = \hat{w}^T x$.
7: Given $\{z_i, y_i\}_{i\in[n]}$, estimate $\hat{h}$ by smoothing splines (with smoothness parameter $\gamma$).

---
Algorithm 2 SIMTree Construction Algorithm
---

Require: $\{x_i, y_i\}_{i\in[n]}$ (Training data), Hyperparameters, e.g., max_depth.
1: Conduct split variable screening.
2: Fit a global SIM on $\{x_i, y_i\}_{i\in[n]}$.
3: while Stopping rules are not reached do
4:    Pick a node pending to be split.
5:    Generate candidate split points using equal-spaced quantiles of split variables.
6:    Evaluate all candidate splits and select the one with the largest predictive performance improvement.
7:    Split the node into left and right nodes if the performance gain is above the predefined threshold.
8: end while
9: Fit a sparse and smooth SIM for each leaf with optimized hyperparameters ($\lambda$, $\gamma$).

To estimate the proposed SIM tree model, a fast training algorithm and/or fast SIM estimation or the fast training algorithm incorporating the fast SIM estimation, e.g., via Stein's lemma and a smoothing spline, and a recursive partitioning strategy may be utilized, as illustrated in Algorithm 2, above. Other considerations are described below.

Variables used for the split may be meaningful for understanding or interpretation. If a data set is of a high dimension, split variables may be limited to a subset of the full variable list. Experts may choose the subset of split variables or selections may be made by conducting split variable screening. The split variables screening step may select the most important variables as candidate split variables. After that, a small subset of variables may be utilized as split variables for tree construction. Such an action may reduce the search space and further speed up training or SIM tree generation. The screening operation may be proceeded by scoring and selecting the top-ranked variables. In particular, a variable may be scored by the performance gain of conducting a small number of equally spaced quantile splits. The most highly scored variables are used as split variables.

To find the optimal split points, an exhaustive search may be used for trees with constant functions. By sorting the variables in ascending order, the impurity (e.g., the variance for regression tasks) for each left and right node may be easily updated without using all the data. However, for parametric and non-parametric functions, an exhaustive search is very expensive, as new models should be re-estimated for each split. Instead of using the exhaustive search, the possible split points may be set to equal-spaced quantiles of the split variable.

Stopping rules may be introduced to guide the node split process. Three criteria, as follows, may be induced or introduced in the construction of the SIM tree. First, a maximum tree depth may be input, indicating where nodes may stop splitting when the maximum tree depth is reached. Second, a minimum samples or sample number for leaves may be input, where the number of samples in a leaf must be larger than or equal to a predefined threshold, otherwise the split may be terminated. Third and finally, a minimum loss (or impurity) decrease may be input, where the split may be stopped if the split will not bring performance improvement above a threshold. In particular, the mean squared error (MSE) loss may be used for regression tasks.

Unlike the SIMs for searching the splits, SIMs at leaves may be directly related to the model performance. To enhance model interpretability and mitigate overfitting, the sparsity and smoothness strengths of each leaf SIM may be fine-tuned by a 5-fold cross-validation grid search.

SIM Tree Simulation Examples

To illustrate the properties of the SIM tree, a 2-D synthetic dataset was generated. The data is assumed to have three different heterogeneous patterns. First, the predictor variables are generated from three independent normal distributions, with the same standard deviation σ=0.2, but different means μ$_1$=(−0.6,−0.5); μ$_2$=(0.6, −0.5); μ$_3$=(0, 0.5), see FIG. 4F, 416. The corresponding responses are obtained by:

$h_1(x)=0.5x_1+0.5x_2$, $h_2(x)=0.5x_1-0.5x_2$, $h_3(x)=2\sin(\pi x_2)$.

Figure 4A:
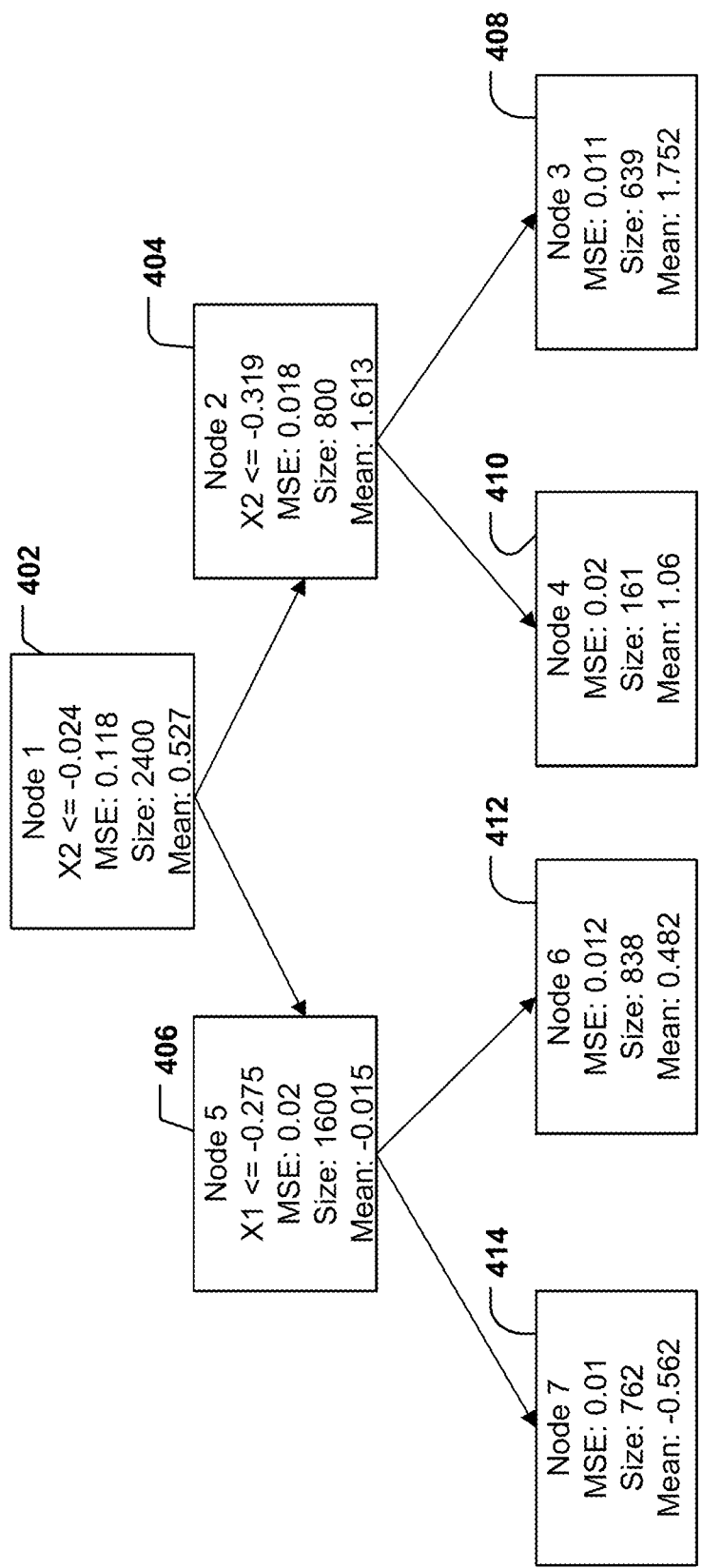
FIG. 4A illustrates another example of a generated SIM tree, in accordance with example embodiments described herein.
Figure 4F:
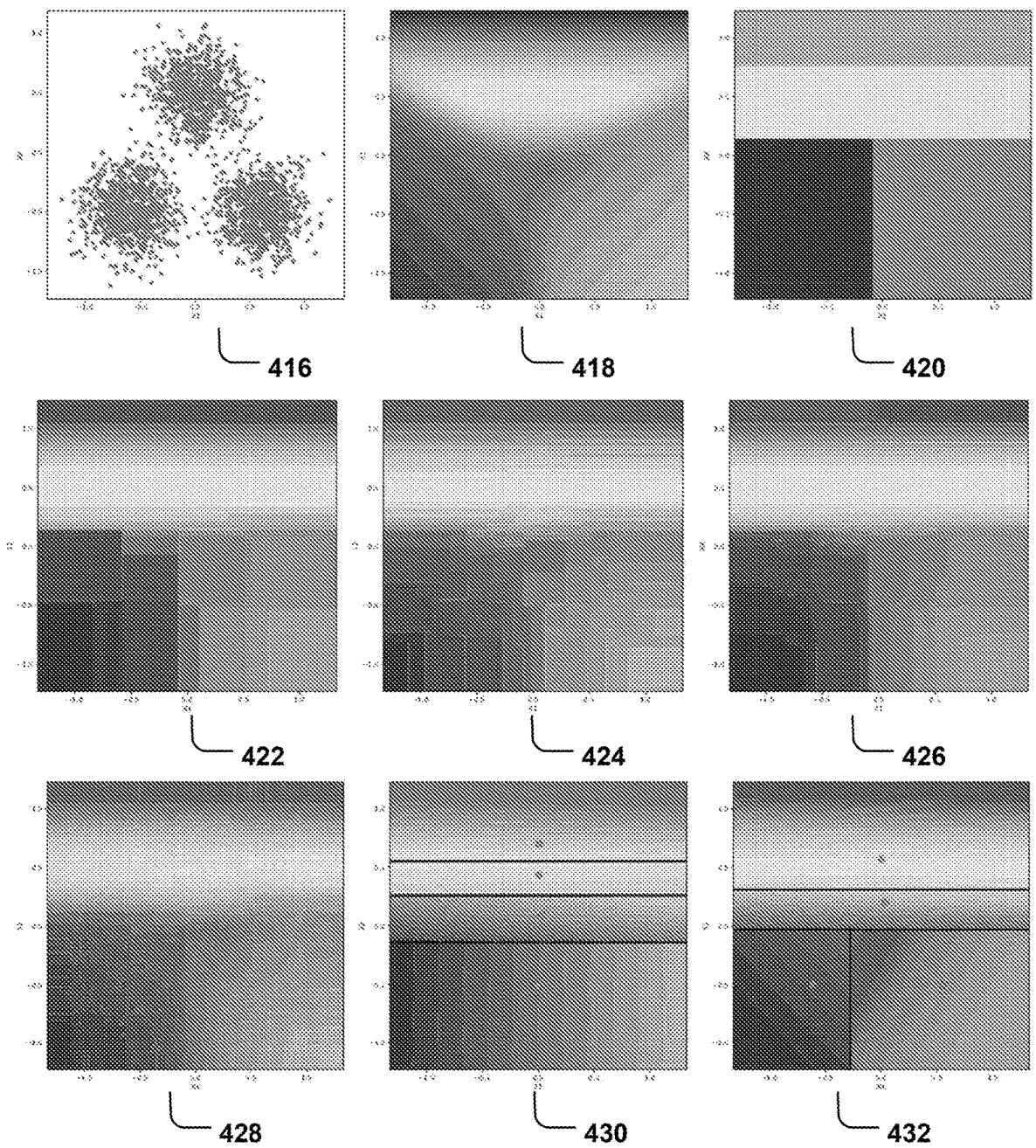
FIG. 4F illustrates a contour plot of the ground truth response surface for different models, in accordance with example embodiments described herein.

The final response is a mixture of these patterns, i.e., $$y = \sum_{i=1}^{3} w_i h_i(x) + \epsilon, \quad w_i = \exp\left\{-\frac{\|x-\mu_i\|^2}{2\times 0.3^2}\right\}.$$

where ε is a Gaussian noise generated from N(0, 0.1$^2$). Each of the sub-group data contains 1000 samples, and the overall data has 3000 samples. The dataset is further split for training (80%) and testing (20%). FIG. 4F shows the contour plot 418 of the ground truth response surface. The entire region can be roughly partitioned into three data segments, i.e., the bottom-left, bottom-right and top region, which corresponds to h$_1$, h$_2$, and h$_3$, respectively.

The fitted SIM tree is shown in FIGS. 4A through 4E. The max depth of the SIM tree, in this example, is 2. The first layer node is called the root node 402, which is split into its left child node 406 and right child node 404 (in the second layer). The child nodes 404, 406 are further split and result in four leaf nodes 408, 410, 412, 414. For each SIM in FIGS. 4B through 4E, the upper line plot is the ridge function; and the lower bar chart is the corresponding projection index.

Each split node is represented by a rectangular box, in which the first line reports the split variable and split point. For example, "x$_2$≤−0.024" at the root node 402 means the second variable is used for the split, and the corresponding threshold is −0.024. All the data whose second variable is less than or equal to −0.024 will be assigned to the left child node 406. The second line of the box presents the MSE loss of SIM fits based on the data belonging to this node. The third line remarks the number of samples in this node, and the last line reports the average response value. The box of leaf nodes 408, 410, 412, 414 contains three lines of information, since no split is performed for the final layer or level.

SIM tree (max depth=2), was also compared with GLMTree (max depth=2), RF (max depth=5), XGBoost (max depth=5), and three CART models with different max depths, and the fitted response surfaces are reported in FIG. 4F. A shallow CART (max depth=2) 420 can roughly capture the main trends and the resulting tree is easy to interpret, while its predictive performance is not that appealing. As max depth increases (CART (max depth=5) 422 and CART (max depth=8) 424), the predictive performance may improve. However, such improvement may require a large number of segments, and the fitted response surfaces become significantly more complicated. This is also true for RF 426 and XGBoost 428. The huge number of segments makes them not interpretable, and even leads to the overfitting problem.

In contrast, a shallow SIM Tree (with max depth=2) 432 can achieve almost perfect predictive performance. As reported in Table I with test root mean squares error (RMSE) close to the standard deviation of the generated Gaussian noise (0.100). As the true model has oblique decision boundaries, the axis-oriented-split-based SIM tree cannot fully recover the true patterns. Nevertheless, SIM tree still finds a good approximation. As shown in FIG. 4F, the entire region is partitioned into four segments, and each one is marked with a red dot. The overall response surface is also similar to the ground truth.

TABLE I

RMSE results of the synthetic dataset, which is averaged over 10 repetitions.

| Method | Train RMSE | Test RMSE |
|---|---|---|
| CART (Depth = 2) | 0.234 ± 0.004 | 0.236 ± 0.010 |
| CART (Depth = 5) | 0.123 ± 0.003 | 0.136 ± 0.006 |
| CART (Depth = 8) | 0.089 ± 0.002 | 0.119 ± 0.004 |
| RF (Depth = 5) | 0.111 ± 0.002 | 0.121 ± 0.006 |
| XGB (Depth = 5) | 0.023 ± 0.001 | 0.123 ± 0.003 |
| GLMTree (Depth = 2) | 0.151 ± 0.009 | 0.150 ± 0.011 |
| SIMTree (Depth = 2) | 0.111 ± 0.008 | 0.115 ± 0.008 |

Examples Using Public Datasets

We consider 20 real-world regression datasets obtained from the UCI machine learning repository or OpenML platform. Each dataset is split into training (80%) and test (20%) sets. Within the training set, a validation set (20%) is further split for selecting the optimal max depth. As the max depth hyperparameter is determined, the model is refitted using all the training and validation data. For performance evaluation, we calculate the test set RMSE. All the data is preprocessed, by imputing missing values with their median or most frequent values, one-hot encoding for categorical variables, and data normalization for numerical variables. The experimental results averaged over 10 repetitions are reported in Table II, below.

For a clear comparison, a pairwise comparison table is presented in Table III, which is summarized over the 20 datasets. From the results, it can be observed that the proposed SIM tree significantly outperforms the intrinsically interpretable CART and GLMTree. Among the three interpretable models, CART is the worst performing one, which is beaten by SIM tree and GLMTree in all the tasks. GLMTree achieves improved performance as compared to CART and shows a slight advantage over SIM tree on 4 out of 20 datasets.

The two black-box models are both competitive. XGBoost tends to perform better on large sample datasets while RF seems to excel on small ones. Note that SIM tree outperforms RF and XGBoost on 14 and 11 datasets, respectively. Therefore, it is concluded that the proposed SIM tree is as competitive as the state-of-the-art ensemble tree models for regression tasks, while maintaining a high level of interpretability.

Figure 5A:
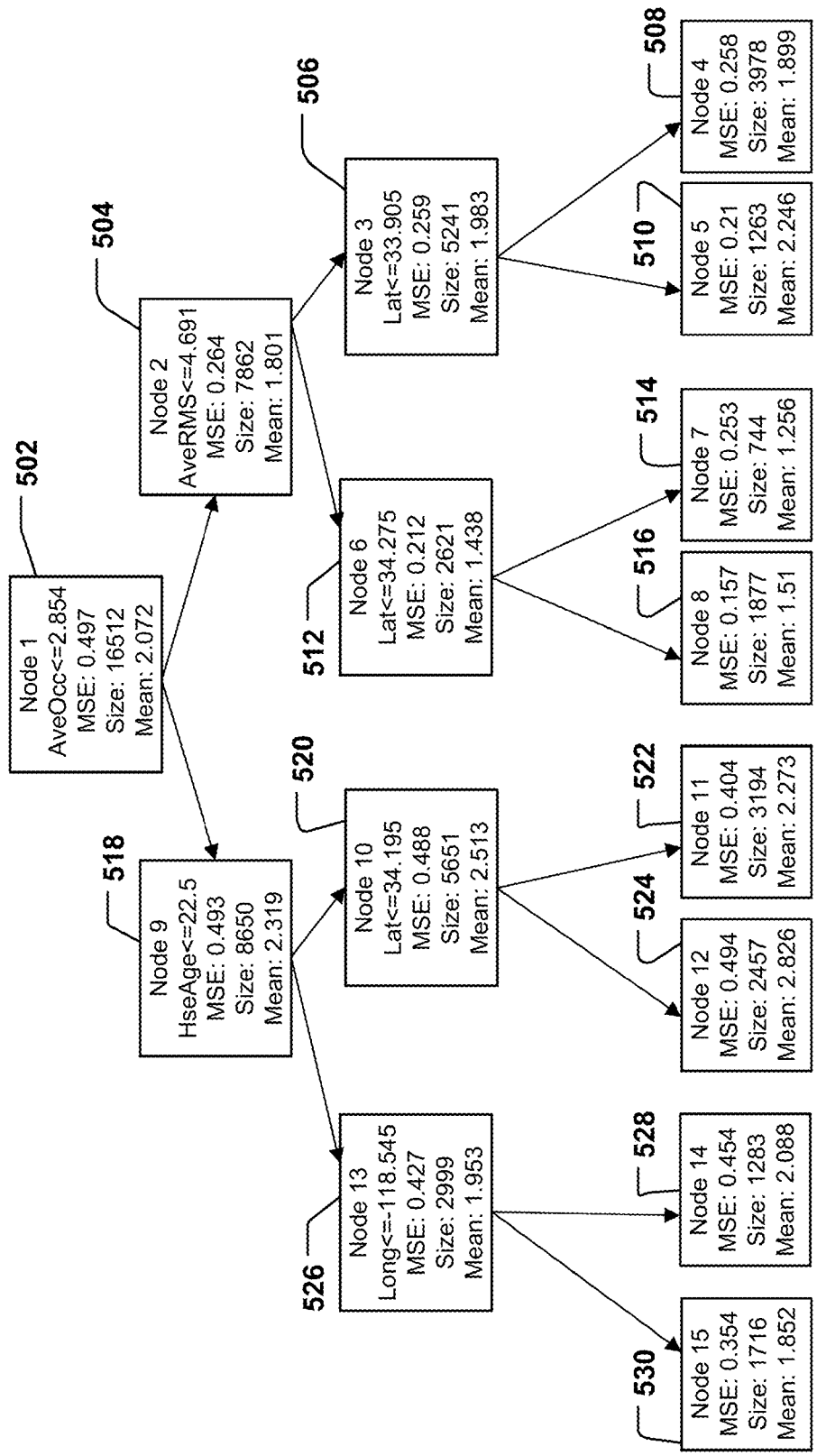
FIG. 5A illustrates another example of a generated SIM tree, in accordance with example embodiments described herein.
Figure 5B:
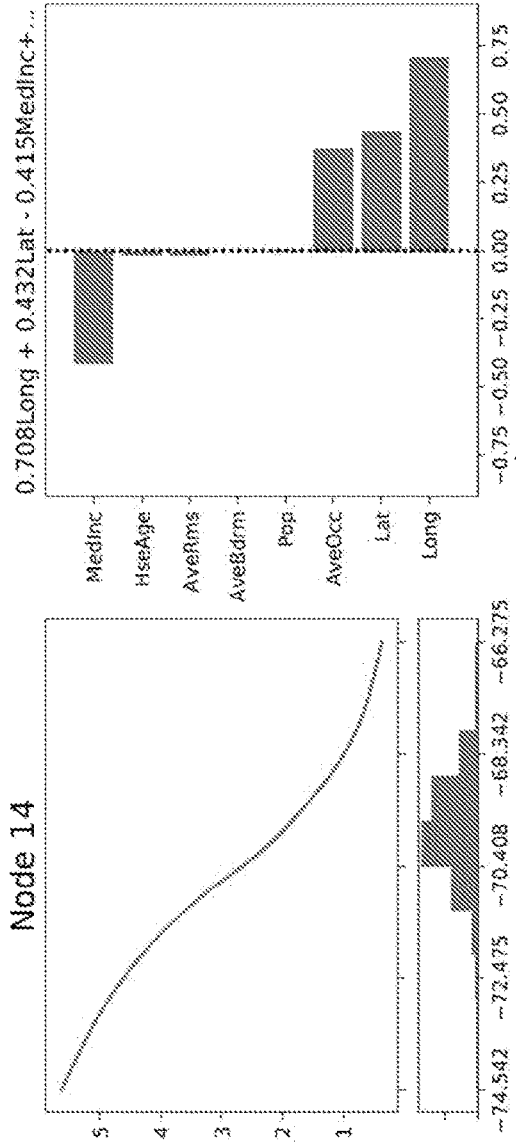
FIG. 5B illustrates an example fitted SIM for node 14 of a SIM tree, in accordance with example embodiments described herein.
Figure 5C:
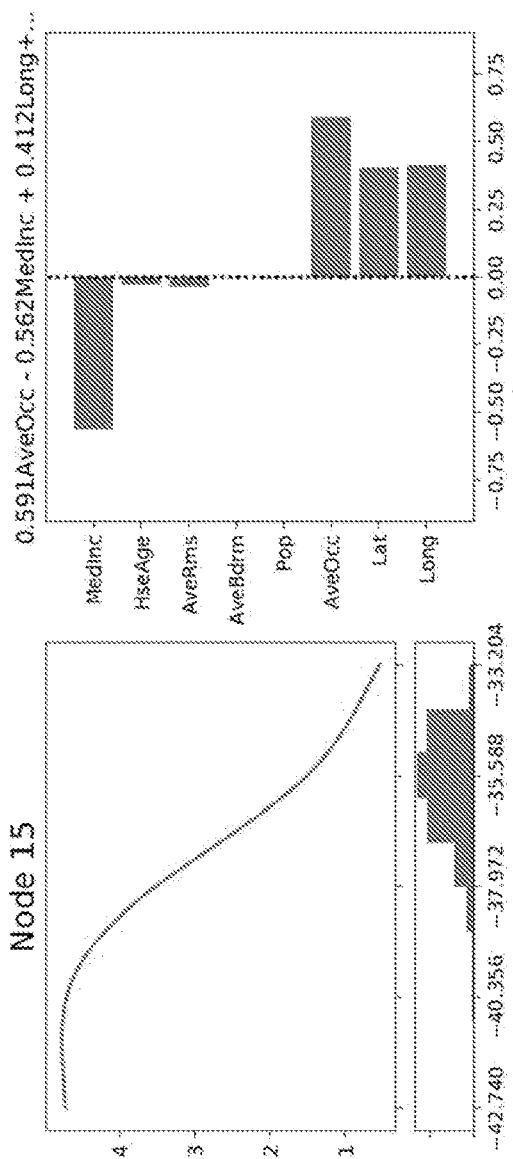
FIG. 5C illustrates an example fitted SIM for node 15 of a SIM tree, in accordance with example embodiments described herein.
Figure 5D:
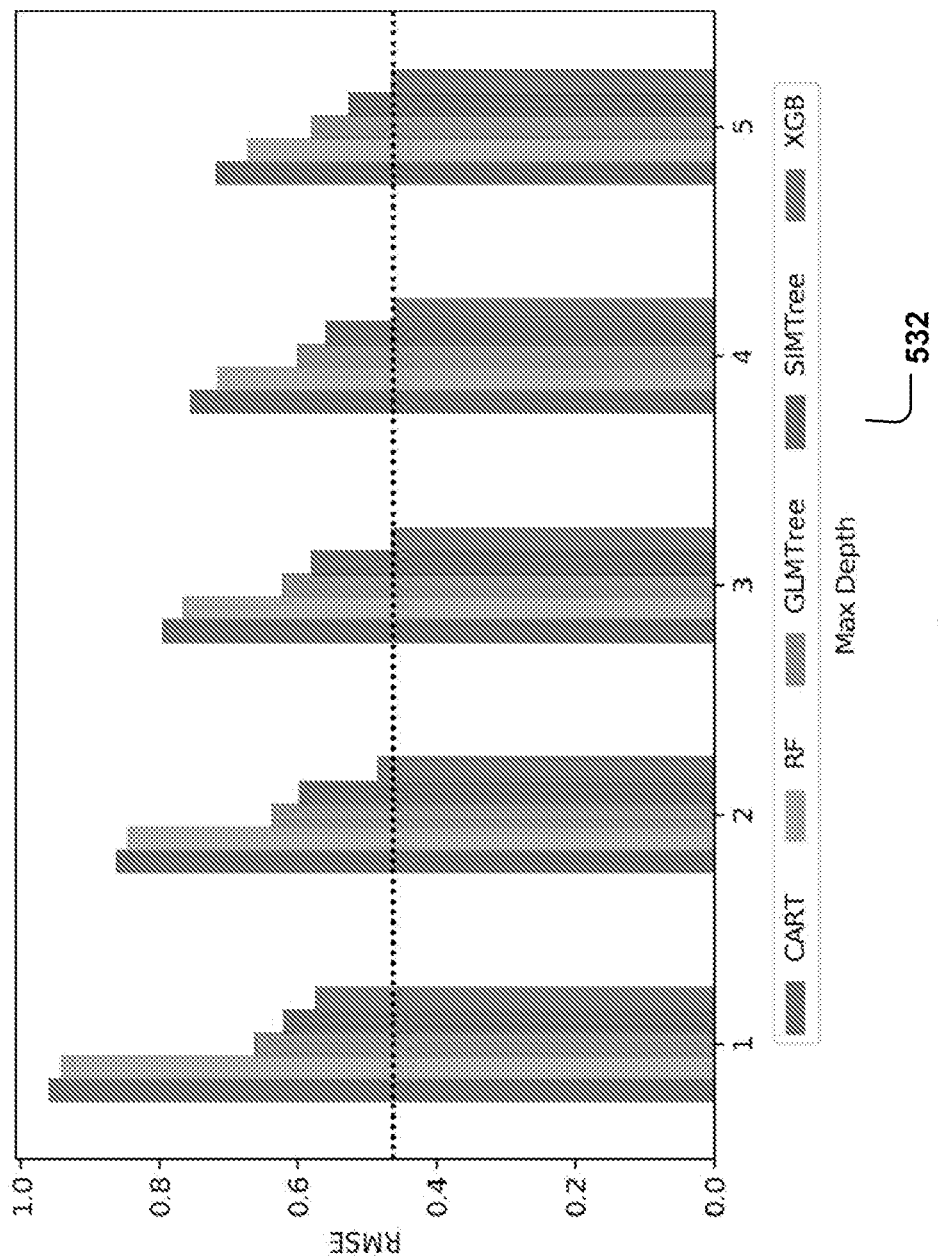
FIG. 5D illustrates an example RMSE for different models at varying depths, in accordance with example embodiments described herein.
Figure 5E:
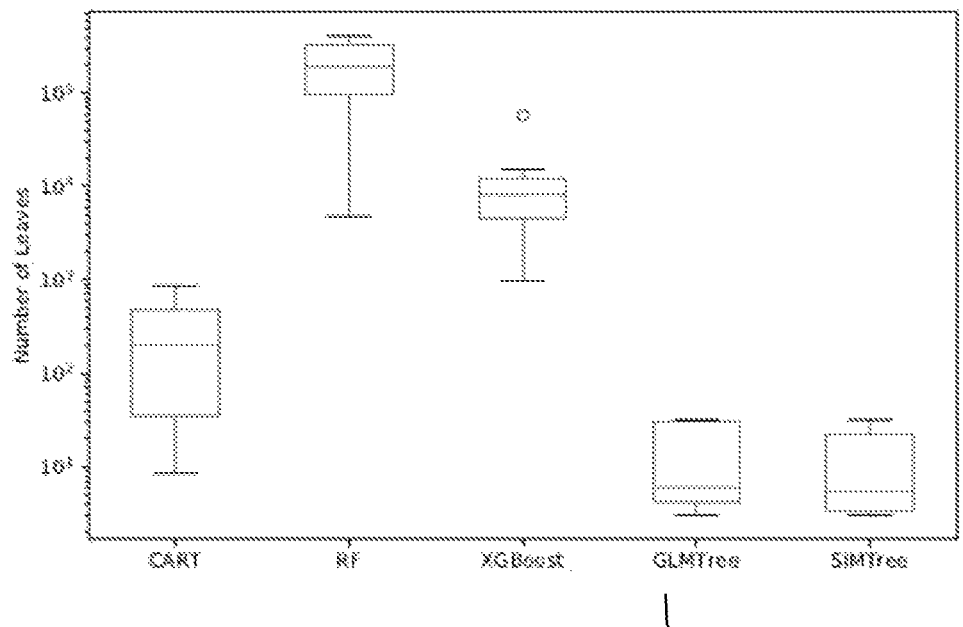
FIG. 5E illustrates a box plot comparing the number of leaves for different models, in accordance with example embodiments described herein.
Figure 5F:
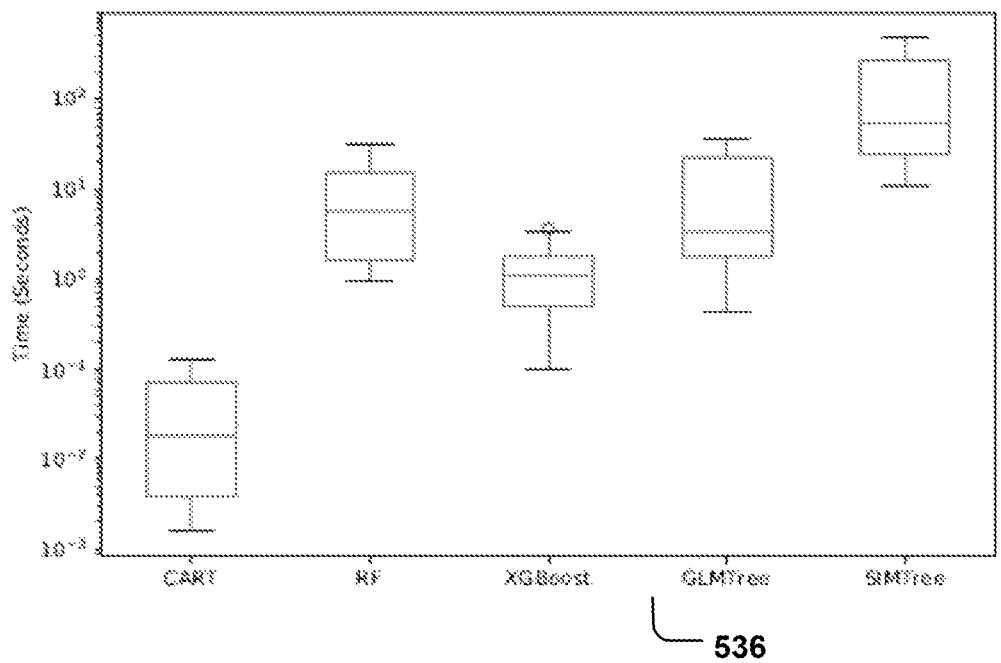
FIG. 5F illustrates a box plot comparing the time to generate different models, in accordance with example embodiments described herein.

Furthermore, the chart 534 in FIG. 5E compares the number of leaves of different tree-based models. The y-axes of these two figures are both in log scale. The number of leaves is a good indicator of tree complexity. The small number of leaves corresponds to a small tree size, which may be considered easier to interpret. XGBoost and RF both have thousands of leaves, which is much larger than that of CART. GLMTree and SIM tree have the smallest tree sizes, with the median number of leaves smaller than 10. In particular, SIM tree tends to have slightly smaller tree size than GLMTree. Therefore, the proposed SIM tree has not only competitive predictive performance but also a sufficiently small tree size, indicating high interpretability.

Given the results of SIM tree on predictive performance and interpretability, the training time of different methods is further investigated. According to chart 536 of FIG. 5F, the median training time of a single SIM tree model is around 100 seconds. The SIM tree model is the slowest among the compared models, however, still affordable and/or quick enough for most practical applications.

The fitted SIM tree may be easily interpreted. Here we use the California housing dataset for illustration. This data was initially published by the U.S. census, and each row represents a census block group. The goal of this dataset is to predict the median house price given 8 continuous predictors per block, including MedInc (median income), HseAge (median house age), AveRms (average number of rooms), AveBdrm (average number of bedrooms), Pop (block population), AveOcc (average house occupancy), Lat (house block latitude), and Long (house block longitude).

We first train the SIM tree and its benchmarks. The test set RMSE against different max depth is visualized in chart 532 of FIG. 5D. Given the same max depth, it can be observed that the proposed SIM tree performs better than CART, RF, and GLMTree, while the best model is the most complicated XGBoost. For demonstration purposes, we visualize the fitted SIM tree (max depth=3) in FIGS. 5A and 5B, with variables presented in their original scales. The results show that AveOcc is selected as the split variable for the root node 502; HseAge and AvgRms are used for the further splits. The dataset is partitioned into 8 segments. For example, for leaf 14 528, it is observed that Long, Lat, and MedInc are the most important components for the projected data, and the median house price shows a monotonic decreasing trend to the projected data. For leaf 15 530, the most influential variables are AveOcc, MedInc, and Long. The corresponding ridge function is constant in the left part of the projected data and then starts monotonic decreasing.

TABLE III

Pairwise comparison of test set RMSE for different models: number indicates how often method in row (significantly) outperforms method in column. The statistical significance is calculated with p-value 0.05.

|         | CART    | RF     | XGBoost | GLMTree | SIMTree |
|---------|---------|--------|---------|---------|---------|
| CART    | —       | 0 (0)  | 3 (1)   | 0 (0)   | 0 (0)   |
| RF      | 20 (18) | —      | 10 (4)  | 10 (7)  | 6 (4)   |
| XGBoost | 17 (16) | 10 (7) | —       | 10 (8)  | 9 (6)   |
| GLMTree | 20 (17) | 10 (5) | 10 (5)  | —       | 4 (1)   |
| SIMTree | 20 (19) | 14 (6) | 11 (7)  | 16 (6)  | —       |

Example Operations

Figure 3:
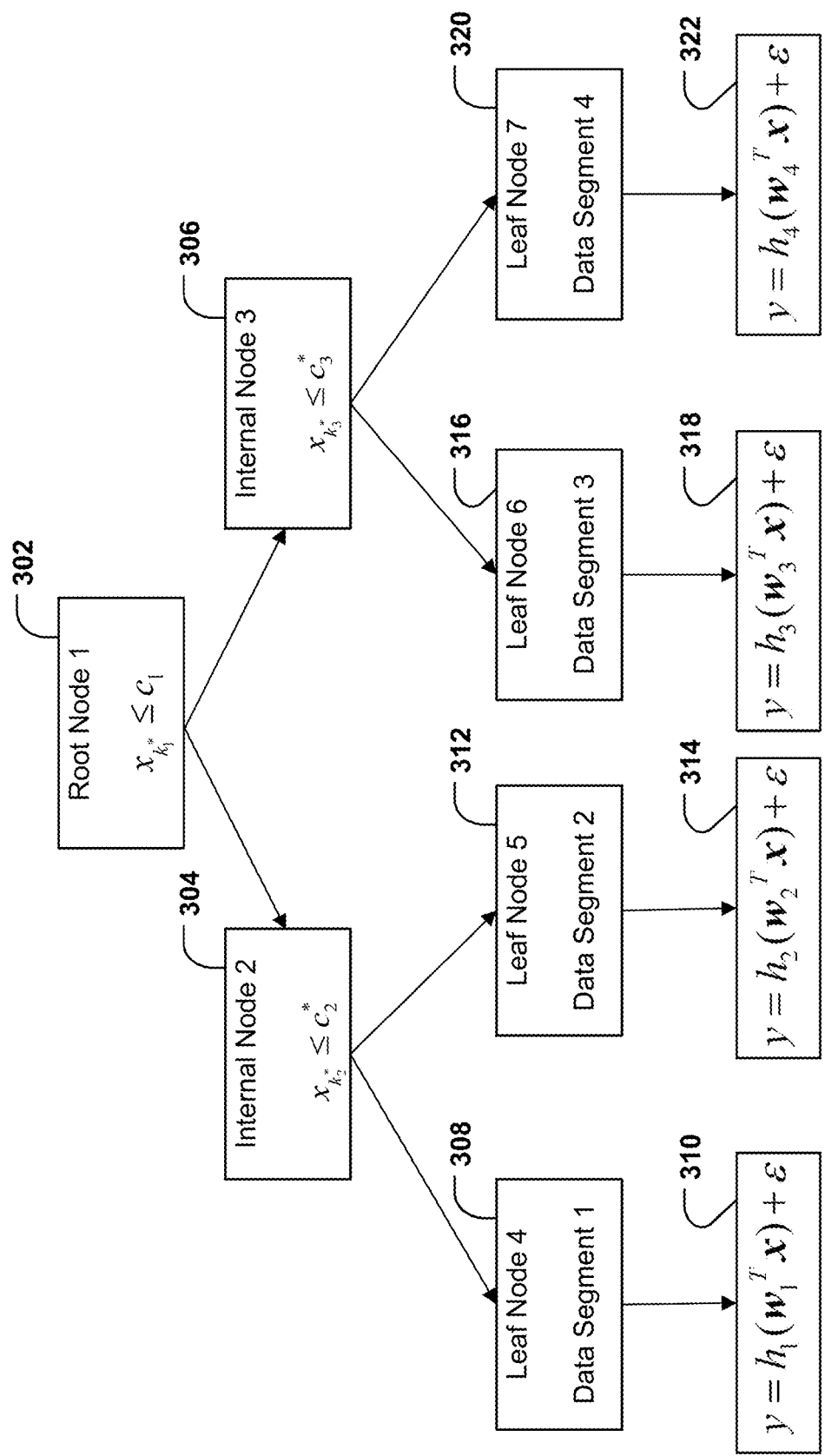
FIG. 3 illustrates an example of a generated SIM tree, in accordance with example embodiments described herein.
Figure 6:
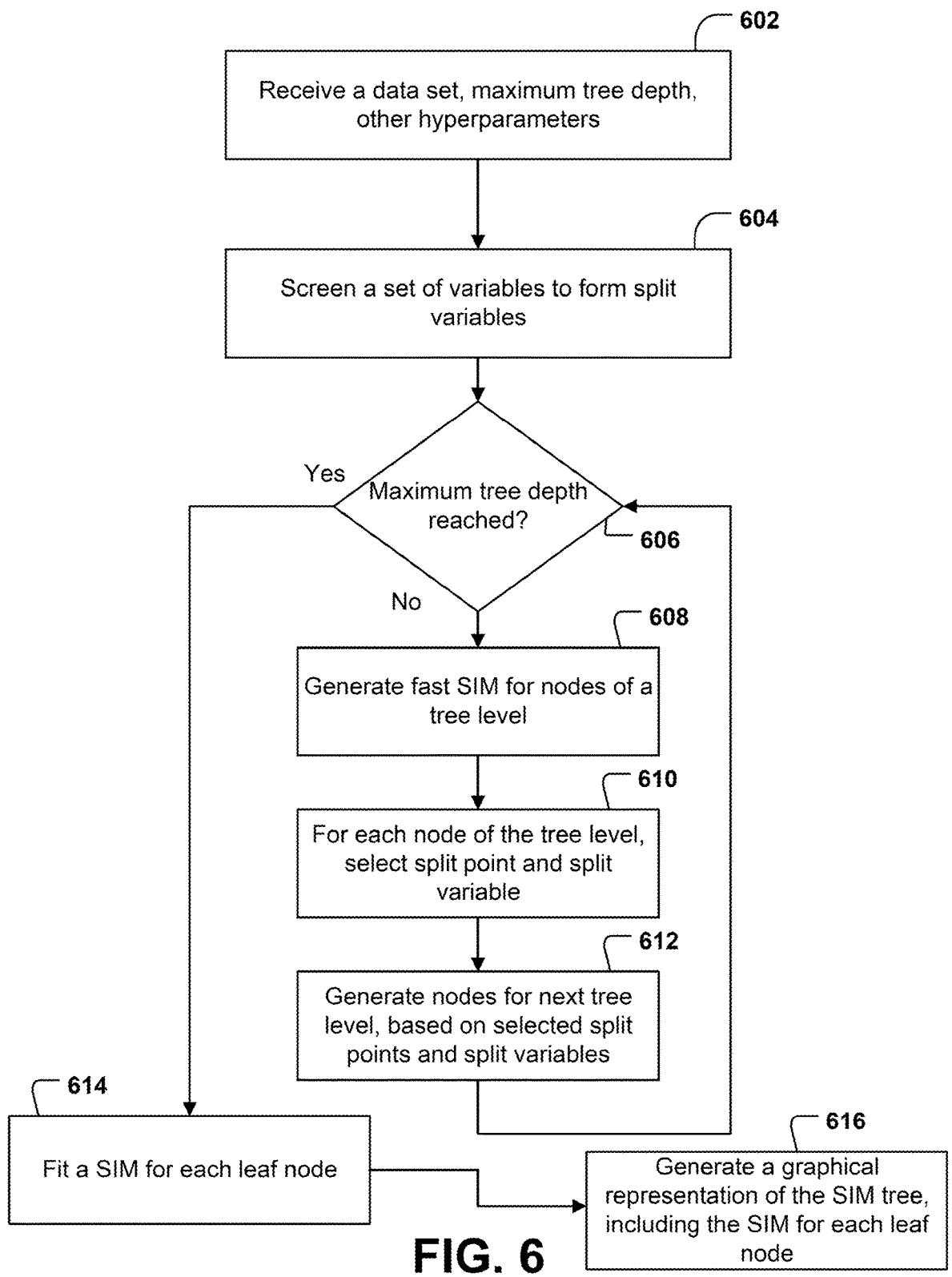
FIG. 6 illustrates an example flowchart for generating a SIM tree, in accordance with some example embodiments described herein

Turning to FIG. 6, a flowchart is illustrated that contains example operations implemented by example embodiments described herein for generating a SIM tree. The operations illustrated in FIG. 6 may, for example, be performed by the system device 102 shown in FIG. 1, which may in turn be embodied by an apparatus 200, which is shown and described in connection with FIG. 2. To perform the operations described below, the apparatus 200 may utilize one or more of processor 202, memory 204, input-output circuitry 206, communications circuitry 208, modeling engine 210, and/or any combination thereof. It will be understood that user interaction with the system device 102 may occur directly via input-output circuitry 208, or may instead be facilitated by a separate client device 108, as shown in FIG. 1, and which may have similar physical componentry facilitating such user interaction. Upon completion of the operations, a SIM tree may be produced as shown in FIG. 3.

In FIG. 6, example operations are described below for generating a SIM tree. As shown by operation 602, the

TABLE II

Testing RMSE on the real-world regression datasets. The first three columns show the data set name, number of samples, and number of variables used for prediction. The best within each group of interpretable and black-box models are highlighted in bold, respectively. As the response variable of different datasets may have different scales, the RMSE results should be multiplied by the corresponding scaling factors in the last column.

| Dataset | n | p | SIMTree | GLMTree | CART | RF | XGB | Scale |
|---|---|---|---|---|---|---|---|---|
| no2 | 500 | 7 | 5.137 ± 0.333 | 5.159 ± 0.393 | 5.773 ± 0.435 | 4.652 ± 0.353 | 4.910 ± 0.362 | ×0.1 |
| sensory | 576 | 11 | 7.089 ± 0.301 | 7.104 ± 0.348 | 7.862 ± 0.581 | 7.144 ± 0.476 | 8.036 ± 0.411 | ×0.1 |
| disclosure z | 662 | 3 | 2.476 ± 0.272 | 2.454 ± 0.252 | 2.508 ± 0.255 | 2.440 ± 0.262 | 2.803 ± 0.193 | ×10000 |
| bike share day | 731 | 11 | 7.055 ± 0.556 | 7.351 ± 0.597 | 9.268 ± 0.661 | 7.078 ± 0.520 | 7.137 ± 0.622 | ×100 |
| era | 1000 | 4 | 1.545 ± 0.044 | 1.560 ± 0.043 | 1.581 ± 0.040 | 1.565 ± 0.042 | 1.583 ± 0.046 | ×1 |
| treasury | 1049 | 15 | 2.143 ± 0.254 | 2.172 ± 0.332 | 3.301 ± 0.282 | 2.286 ± 0.357 | 2.307 ± 0.299 | ×0.1 |
| weather izmir | 1461 | 9 | 1.205 ± 0.126 | 1.205 ± 0.141 | 1.744 ± 0.107 | 1.259 ± 0.112 | 1.283 ± 0.095 | ×1 |
| airfoil | 1503 | 5 | 2.306 ± 0.171 | 2.598 ± 0.153 | 2.802 ± 0.261 | 1.981 ± 0.096 | 1.562 ± 0.148 | ×1 |
| wine red | 1599 | 11 | 6.240 ± 0.195 | 6.190 ± 0.155 | 6.703 ± 0.266 | 5.691 ± 0.247 | 5.895 ± 0.294 | ×0.1 |
| skill craft | 3395 | 18 | 0.940 ± 0.024 | 0.948 ± 0.021 | 1.049 ± 0.029 | 0.921 ± 0.024 | 0.993 ± 0.028 | ×1 |
| abalone | 4177 | 8 | 2.171 ± 0.091 | 2.178 ± 0.072 | 2.368 ± 0.056 | 2.181 ± 0.067 | 2.359 ± 0.075 | ×1 |
| parkinsons tele | 5875 | 19 | 2.035 ± 0.140 | 2.863 ± 0.104 | 2.977 ± 0.503 | 2.245 ± 0.114 | 1.913 ± 0.175 | ×1 |
| wind | 6574 | 14 | 3.054 ± 0.059 | 3.054 ± 0.059 | 3.720 ± 0.113 | 3.196 ± 0.068 | 3.152 ± 0.093 | ×1 |
| cpu small | 8192 | 12 | 2.894 ± 0.054 | 2.835 ± 0.068 | 3.799 ± 0.287 | 2.964 ± 0.112 | 2.914 ± 0.240 | ×1 |
| ccpp | 9568 | 4 | 3.744 ± 0.111 | 3.803 ± 0.089 | 4.067 ± 0.109 | 3.462 ± 0.080 | 3.016 ± 0.101 | ×1 |
| electrical grid | 10000 | 11 | 1.070 ± 0.032 | 1.178 ± 0.022 | 1.901 ± 0.023 | 1.262 ± 0.030 | 0.964 ± 0.023 | ×0.01 |
| ailerons | 13750 | 40 | 1.620 ± 0.040 | 1.650 ± 0.050 | 1.950 ± 0.050 | 1.640 ± 0.049 | 1.610 ± 0.030 | ×0.0001 |
| elevators | 16599 | 18 | 2.073 ± 0.032 | 2.140 ± 0.038 | 3.604 ± 0.071 | 2.884 ± 0.062 | 2.142 ± 0.031 | ×0.001 |
| bike share hour | 17379 | 12 | 4.824 ± 0.181 | 5.061 ± 0.193 | 6.138 ± 0.157 | 5.254 ± 0.135 | 4.099 ± 0.095 | ×10 |
| california housing | 20640 | 8 | 5.267 ± 0.107 | $.804 ± 0.121 | 6.399 ± 0.144 | 5.390 ± 0.098 | 4.646 ± 0.084 | ×0.1 | apparatus 200 includes means, such as memory 204, input-output circuitry 206, communications circuitry 208, or the like, for receiving a data set, maximum tree depth, and/or other hyperparameters. The other hyperparameters may include a smoothness strength, a sparsity strength, a sample threshold, MSE threshold, and/or RMSE threshold. The data set may have previously been stored in a storage device 104 as set forth in FIG. 1, which may comprise memory 204 of the apparatus 200 or a remote storage device 104 accessible by the apparatus 200 using communications circuitry 208 or the like. In such cases, the data set may be retrieved by the apparatus 200 unilaterally. However, the data set, in addition to the other inputs or hyperparameters, may be received from a separate device with which a user interacts (e.g., one of client device 106A through client device 106N), in which case the data set, maximum tree depth, and/or other hyperparameters may be received via communications circuitry 208. If the user interacts directly with the apparatus 200, the data set, maximum tree depth, and/or other hyperparameters may be received via the input-output circuitry 206. The data set may comprise a series of data points, where each data point has a value for each known feature in the data set. The data set may include a number of variables, each corresponding to a particular data point for a particular data entry.

As shown by operation 604, the apparatus 200 includes means, such as modeling engine 210 or the like, for screening a set of variables to thereby form split variables. In an example, the most important variables may be chosen as a split variable. In another example, during screening, the number of equally spaced quantile splits is set to 5 and the most important 10 variables are chosen as split variables. In such examples, the split variables may be a subset of the total variables. Once the split variables are chosen, the modeling engine 210 may also score and select the top-ranked variables. The variables may be scored based on the performance gain conducted by a small number of equally spaced quantile splits.

As shown by operation 606, the apparatus 200 includes means, such as modeling engine 210 or the like, for determining whether the maximum tree depth has been reached. The modeling engine 210 may check or determine that the maximum tree depth has not been exceeded. As new child nodes or leaf nodes are generated, after split points and/or split variables are determined for the nodes at that particular layer, the modeling engine 210 may determine whether the maximum tree depth has been reached and, if not, proceed with operations 608, 610, and 612. Once the SIM tree has reached maximum tree depth, the modeling engine 210 may move to operation 614.

As shown by operation 608, the apparatus 200 includes means, such as modeling engine 210 or the like, for generating or applying one or more fast training algorithms or fast SIM estimations for nodes at the current tree level, as described above in the "SIM Tree" section. Such fast training algorithms or fast SIM estimations may include generating a projection index or coefficient via a Stein's lemma or other SIM equations and fitting a non-parametric function with a curve fitting technique. If a sparsity strength is input, the speed of the fast training algorithm or fast SIM estimation model may be further increased. The sparsity strength may be used to remove any negligible projection indices or coefficients. Further, to prevent overfitting of the non-parametric function, an input smoothness strength may be utilized. In an example, the one or more fast training algorithms or fast SIM estimations may be executed for each split variable at the node. The one or more fast training algorithms or fast SIM estimations may be executed for equally spaced quantile splits.

As shown by operation 610, the apparatus 200 includes means, such as modeling engine 210 or the like, for each node of the tree level or current tree level, select a split point and split variable. The modeling engine 210 may select the split point and split variable that exhibits the highest performance or performance gain in relation to the fast training algorithms or fast SIM estimations. The modeling engine 210 may simulate or execute the fast training algorithms or fast SIM estimations for a node for one or more of the split variables or for all the split variables of the node. A performance gain may be determined based on MSE or RMSE determined for a particular fast SIM estimation. For example, for a particular node, many fast SIM estimations may be executed for a number of split variables and/or split points. For each fast SIM estimation, the MSE or RMSE may be determined. The split variable and/or split point with the lowest MSE or RMSE, barring any other factors precluding such a combination (e.g., MSE or RMSE threshold, sample number for potential next set of nodes, and/or other factors), may be selected as the split variable and/or split point. In another example, each fast SIM estimation for a particular node may be scored based on a number of factors (e.g., MSE, RMSE, number of samples for each potential next set of nodes, interpretability, and other factors). The fast SIM estimation with the highest score may then determine the split variable and/or split point.

As shown by operation 612, the apparatus 200 includes means, such as modeling engine 210 or the like, for generating nodes for the next tree level. The nodes for the next tree level may be associated with or may include a subset of the data set of the nodes parent. In other words, a parent node may split the data points in the parent node, based on the selected split variable, and transmit the data or associate the data with nodes at the next tree level. After operation 612 is finished, the procedure returns to operation 606, at which the apparatus 200 includes means, such as modeling engine 210, to check or determine whether the maximum tree depth has been reached. FIG. 3 illustrates a tree that may be generated in accordance with operations 606-612, and for which split points from the root node 302 may generate subsets of data for the next level of nodes, e.g., internal nodes 304, 306. Further, internal nodes 304, 306 may split to generate leaf nodes 308, 312, 316, 320.

Upon a determination at operation 606 that the maximum tree depth has been reached, the procedure may advance to operation 614, which illustrates that the apparatus 200 includes means, such as modeling engine 210 or the like, to fit a SIM for each leaf node. Once the leaf nodes (e.g., the nodes of the last tree depth level) are generated, the modeling engine 210 may fit a SIM for each leaf node or the nodes of the last tree depth level. The modeling engine 210 may determine other factors or data points for any of the nodes, such as MSE, RMSE, the mean, or other factors. For example, the boxes illustrating SIM equations 310, 314, 318, 322 may be utilized to fit a SIM to the subset of data in the corresponding leaf node 308, 312, 316, 320.

As shown by operation 616, the apparatus 200 includes means, such as communications circuitry 206, input-output circuitry 208, modeling engine 210, or the like for generating a graphical representation of the SIM tree. The graphical representation may be displayed as a tree like structure with various connected nodes. For each of the nodes, which may be represented by some shape, such as a square, in the tree like structure, various data points may be included, e.g., the mean, the MSE, RMSE, the size of the associated data set, the split variable, and/or other data. Further, the leaf nodes or the nodes of the last tree depth level may include the fitted SIM for the corresponding node. Based on the data included in the graphical representation, a user may easily be able to explain how a decision was made. For example, for an inner node, a user may observe that the split variable was some particular and important or relevant data (e.g., amount of credit and/or debt). The user may then observe how the final node is reached and may use the fitted SIM to make further decisions (e.g., deny credit and so on).

As described above, example embodiments provide methods and apparatuses that enable generation of a highly interpretable and highly accurate SIM tree. Utilization of the SIM tree allows users to easily interpret and explain decisions or predictions made for each node of the SIM tree. Specifically, the SIM tree provides additional insight into the data being modeled, by revealing more specific information regarding the relationship between the various features in the data and the decision boundary produced by generation of the SIM tree. Overall, the example embodiments contemplated herein illustrate that generating a SIM tree provides technical solutions that address real-world interpretability problems, where interpretability is of paramount importance, while maintaining high levels of accuracy and quick generation. In particular, the SIM tree, when compared with other model-based trees, exhibits an accuracy higher than most other models and close to the model exhibiting the highest accuracy (see chart 532 of FIG. 5D illustrating the RMSE for various models, XGBoost being the lowest and the SIM tree being the second lowest). Further, the SIM tree, while not the fastest model in terms of generation, is still quick, taking about 100 seconds to generate (see chart 536 of FIG. 5F).

FIG. 6 illustrates a flowchart describing operations performed by apparatuses, methods, and computer program products according to various example embodiments. It will be understood that each block of the flowchart, and combinations of blocks in the flowchart, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowchart, and combinations of blocks in the flowchart, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating a single-index model (SIM) tree, the method comprising:
    while a maximum tree depth has not been reached, iteratively:
        (i) generating a SIM estimation for one or more nodes of a tree level based on a data set,
        (ii) for each node of the one or more nodes, selecting a split point and a split variable based on the SIM estimation for that node, and
        (iii) based on the selected split points and split variables for the nodes at the tree level, generating a set of nodes for a next tree level; and
    in response to generation of nodes for the maximum tree depth, fitting a SIM for each leaf node of the SIM tree based on a subset of the data set represented by that leaf node.

2. The method of claim 1, further comprising:
    after generation of the SIM tree, generating a graphical representation of the SIM tree, the graphical representation depicting a box for each of the one or more nodes.

3. The method of claim 2, wherein the box for a node within a layer not at the maximum tree depth includes a split variable, a split point for the split variable, a mean squared error loss, a sample number representing a number of data points for a node, and an average response level.

4. The method of claim 3, wherein the box for a node within a layer at the maximum tree depth includes a mean squared error loss, a sample number representing a number of data points for a node, an average response level, and a corresponding fitted SIM.

5. The method of claim 1, further comprising:
   prior to generation of the SIM tree, receiving a smoothness strength and a sparsity strength for the SIM estimation as part of the data set.

6. The method of claim 5, wherein the SIM estimation utilizes a value of 0 for the sparsity strength in a calculation of projection coefficients and a fixed value for the smoothness strength in a cubic smoothing spline calculation.

7. The method of claim 6, wherein projection coefficients in a SIM estimation comprises a Stein's lemma calculation.

8. The method of claim 5, wherein the data set, the maximum tree depth, the smoothness strength, and the sparsity strength are received from a user interface.

9. The method of claim 1, further comprising:
   prior to generation of the SIM tree, receiving a minimum sample number per node and a minimum loss decrease.

10. The method of claim 9, wherein the selection of the split point and split variable is further based on a number of samples per each potential split in relation to the minimum sample number per node and the mean squared error loss per each potential split in relation to the minimum loss decrease.

11. The method of claim 1, further comprising:
    scoring the split variables, wherein a split variable for a node is further selected based on a split variable's score.

12. An apparatus for generating a single-index model (SIM) tree, the apparatus comprising:
    a modeling engine configured to:
      screen a set of variables from a data set to form split variables,
      in response to a determination that maximum tree depth has not been reached:
        (i) generate a SIM estimation for one or more nodes of a tree level,
        (ii) for each node of the one or more nodes, select a split point and split variable based on the SIM estimation for that node, and
        (iii) based on selected split points and split variables for the nodes at the tree level, generate a set of nodes for a next tree level, and
      in response to a determination that the next tree level is equal to the maximum tree level:
        (i) fit a SIM for each node at each leaf node of the SIM tree based on a subset of the data set represented by that leaf node.

13. The apparatus of claim 12,
    wherein the modeling engine is further configured to generate a graphical representation for each node of the SIM tree,
    wherein each graphical representation for each node other than the leaf nodes is depicted as a box including data points, and
    wherein each graphical representation for each leaf node is depicted as a box including data points and a corresponding fitted SIM.

14. The apparatus of claim 13, wherein the box for the nodes other than the leaf nodes include a split variable, a split point for the split variable, a mean squared error loss, a sample number representing a number of data points for a node, and an average response level.

15. The apparatus of claim 13, wherein the box for the leaf nodes include a mean squared error loss, a sample number representing a number of data points for a node, and an average response level.

16. The apparatus of claim 13, further comprising communications circuitry configured to output each graphical representation for each node and for each leaf node as an interactive tree structure.

17. The apparatus of claim 12, wherein the input-output circuitry is further configured to receive a smoothness strength for each SIM of each node other than the leaf node to achieve a smooth representation and a sparsity strength for each SIM of each node other than the leaf node to remove negligible coefficients.

18. The apparatus of claim 17, wherein sparsity for the fitted SIM of each leaf node is set to 0 and smoothness is set to a fixed value.

19. A computer program product for generating a single-index model (SIM) tree, the computer program product comprising at least one non-transitory computer-readable storage medium storing software instructions that, when executed, cause an apparatus to:
    determine a set of variables from a data set to form a set of split variables;
    while a tree level is not equal to a maximum tree depth:
      generate a SIM estimation for each node of a current tree level based on a set of data corresponding to that node, a smoothness strength, and a sparsity strength, and
      generate, based on a split point and the set of split variables, a set of nodes for a next tree level, each node of the set of nodes including a subset of data included in a parent node; and
    in response to a determination that the next tree level is at the maximum tree depth, fit a SIM for each node at the maximum tree depth based on a subset of data of that node at the maximum tree depth.

20. The computer program product of claim 19, wherein the apparatus is further configured to output a graphical representation of the SIM tree including each fitted SIM for nodes at the maximum tree depth level.

* * * * *